(12) United States Patent
Rothwein et al.

(10) Patent No.: US 6,233,617 B1
(45) Date of Patent: May 15, 2001

(54) DETERMINING THE VISIBILITY TO A REMOTE DATABASE CLIENT

(75) Inventors: Thomas M. Rothwein, San Jose; John L. Coker, Hillsborough, both of CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 09/375,900

(22) Filed: Aug. 17, 1999

Related U.S. Application Data

(63) Continuation of application No. PCT/US98/02756, filed on Feb. 24, 1998.
(60) Provisional application No. 60/039,167, filed on Feb. 26, 1997.

(51) Int. Cl.[7] ....................................................... G06F 15/16
(52) U.S. Cl. ........................................... 709/227; 709/228
(58) Field of Search ..................................... 709/227, 228, 709/229, 225, 217, 237; 713/155; 380/280, 282; 714/7; 707/2, 9, 10, 104

(56) References Cited

U.S. PATENT DOCUMENTS

| | | | |
|---|---|---|---|
| 5,319,710 | 6/1994 | Atalla et al. | 380/23 |
| 5,590,199 | 12/1996 | Krajewski, Jr. et al. | 380/25 |
| 5,657,390 | 8/1997 | Elgamal et al. | 380/49 |
| 5,757,925 | * 5/1998 | Faybishenko | 380/49 |
| 5,812,668 | * 9/1998 | Weber | 380/24 |
| 5,923,756 | * 7/1999 | Shambroom | 380/21 |
| 5,933,503 | * 8/1999 | Schell et al. | 380/25 |
| 6,029,195 | * 2/2000 | Herz | 709/219 |
| 6,041,357 | * 3/2000 | Kunzelman et al. | 709/228 |

OTHER PUBLICATIONS

Atkins, et al., PGP Message Exchange Formats, RFC 1991, Aug. 1996.

DCE 1.1 Online Documentation, Transarc Corporation, 1996, pp. 1–34, http://www.ux1.eiu.edu/~csjay/dce/intro_to_dce_4.html.

Adam Shostack, "An Overview of SSL (Version 2)," http://www.homeport.org/~adam/ssl.html, May 1995.*

* cited by examiner

Primary Examiner—Mehmet B. Geckil

(57) ABSTRACT

A method and system for establishing and maintaining a secure TCP/IP session between a server (1) having a database (3) and a client (21-a, 21-b, 21-c), the method includes sending a hello message from the client to the server (1) to establish client authorization, the server (1) sends a server session ID and a session private key to the client to establish the session.

43 Claims, 9 Drawing Sheets

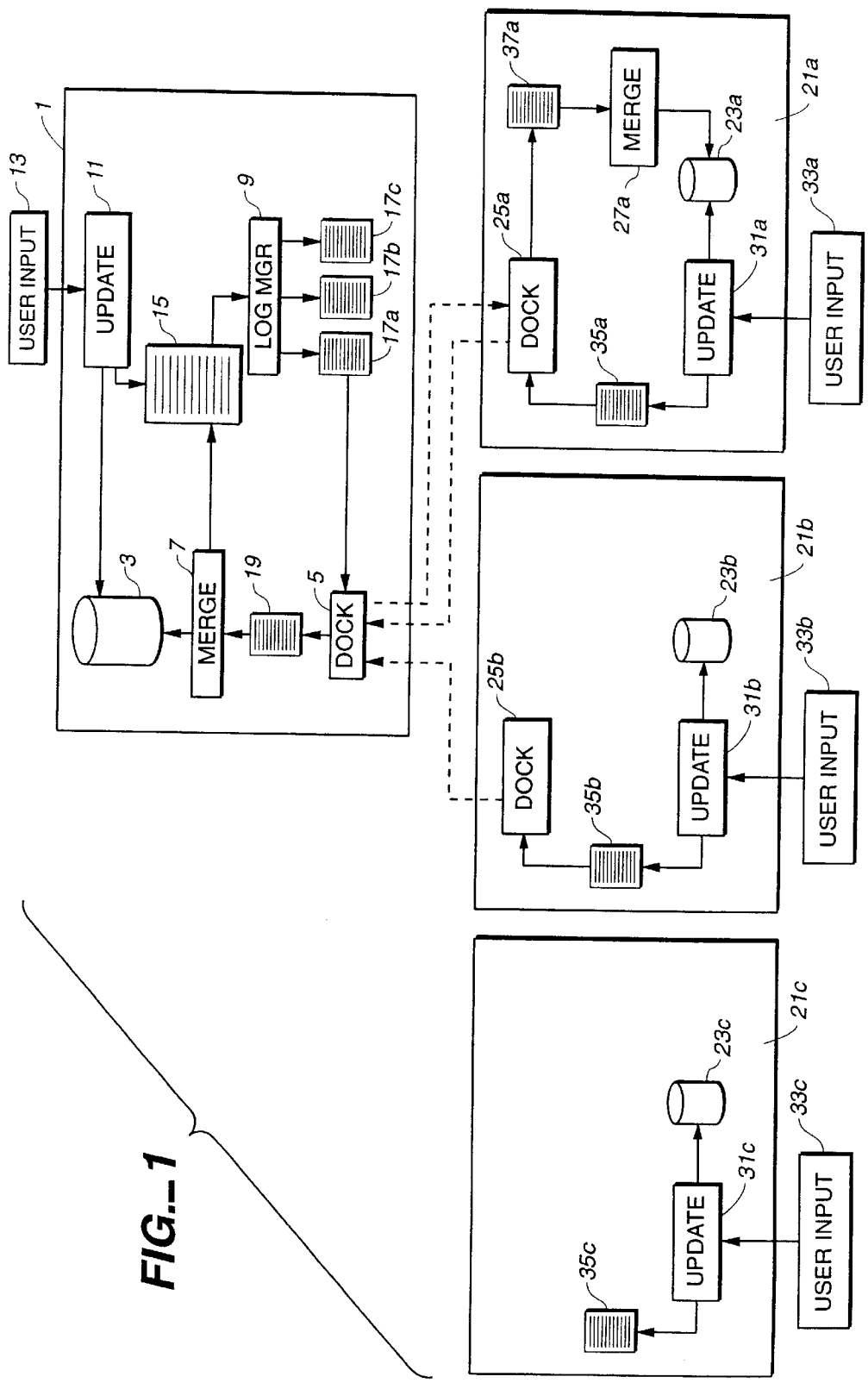
FIG._1

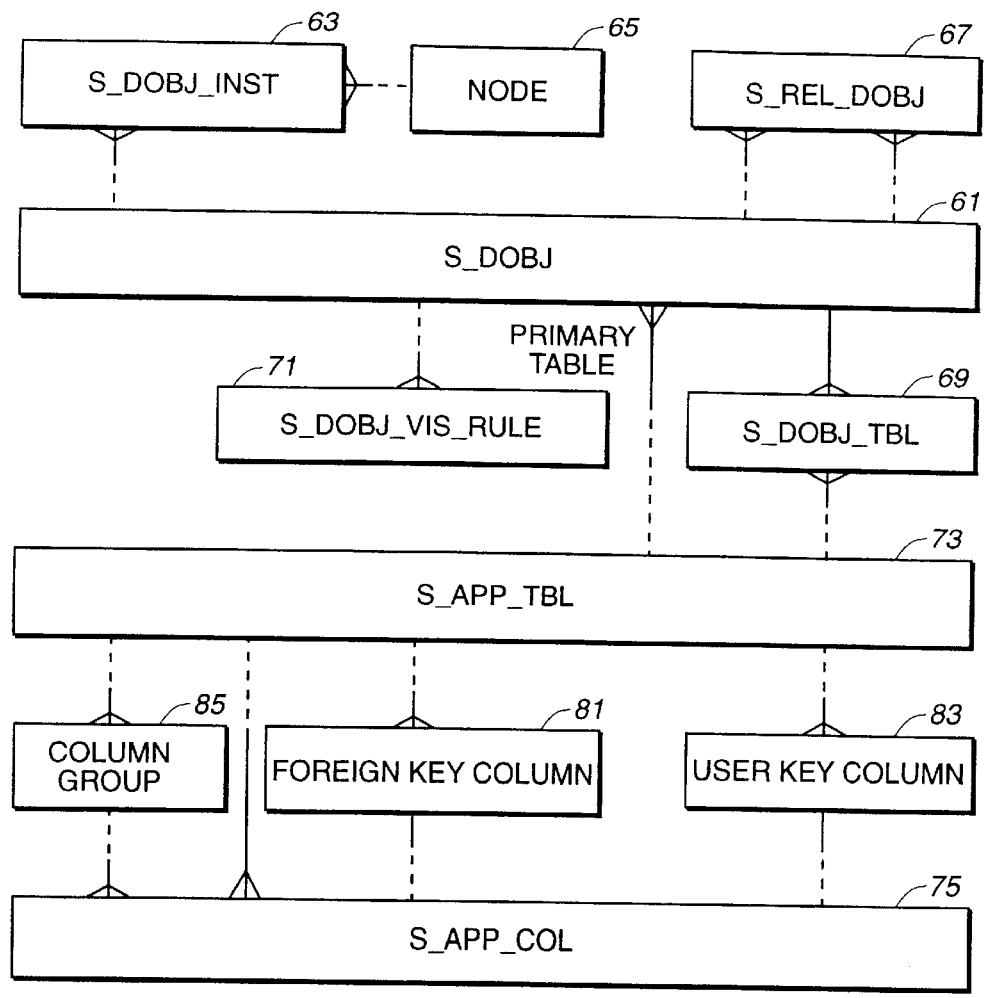
FIG._2

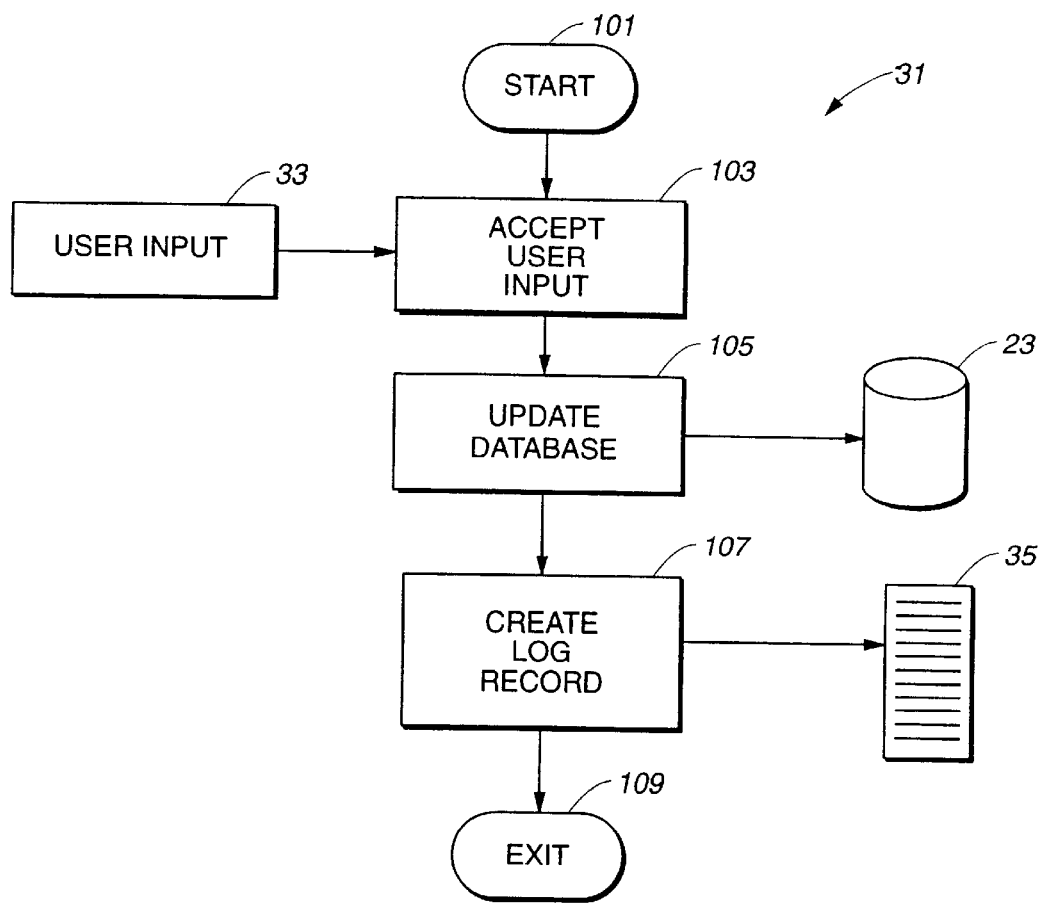
FIG._3

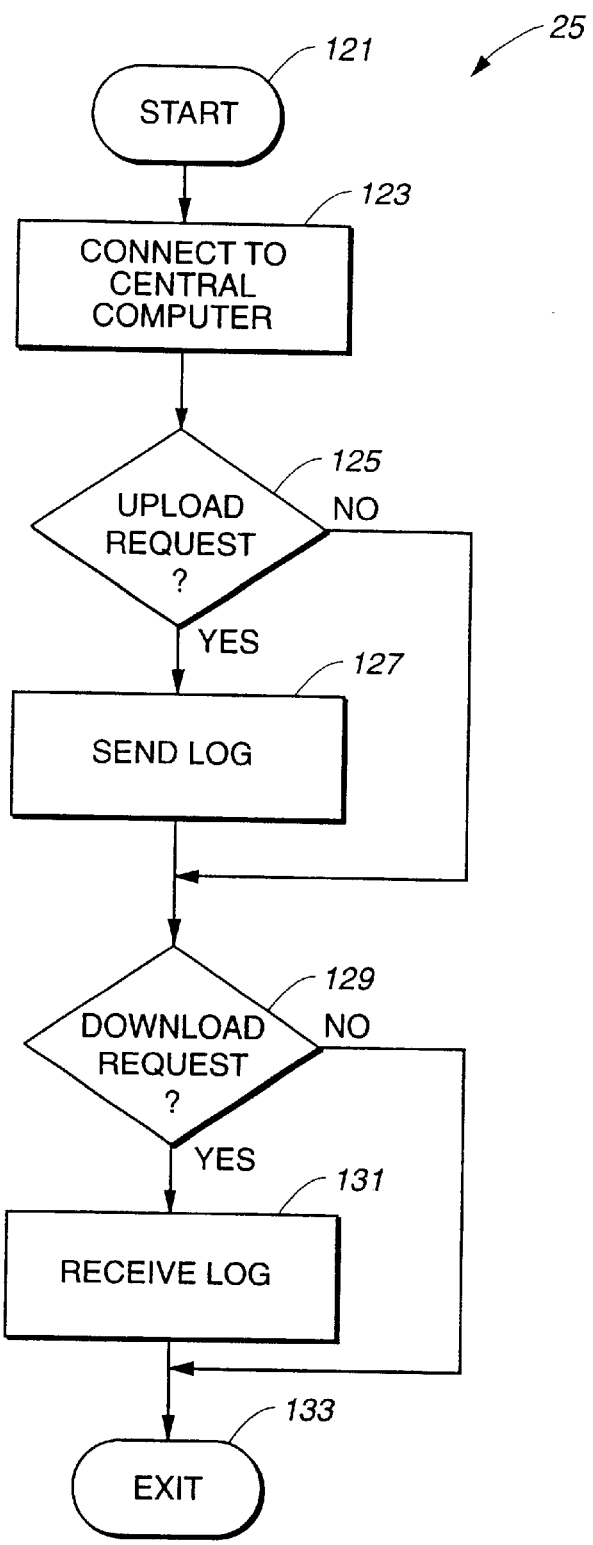
FIG._4

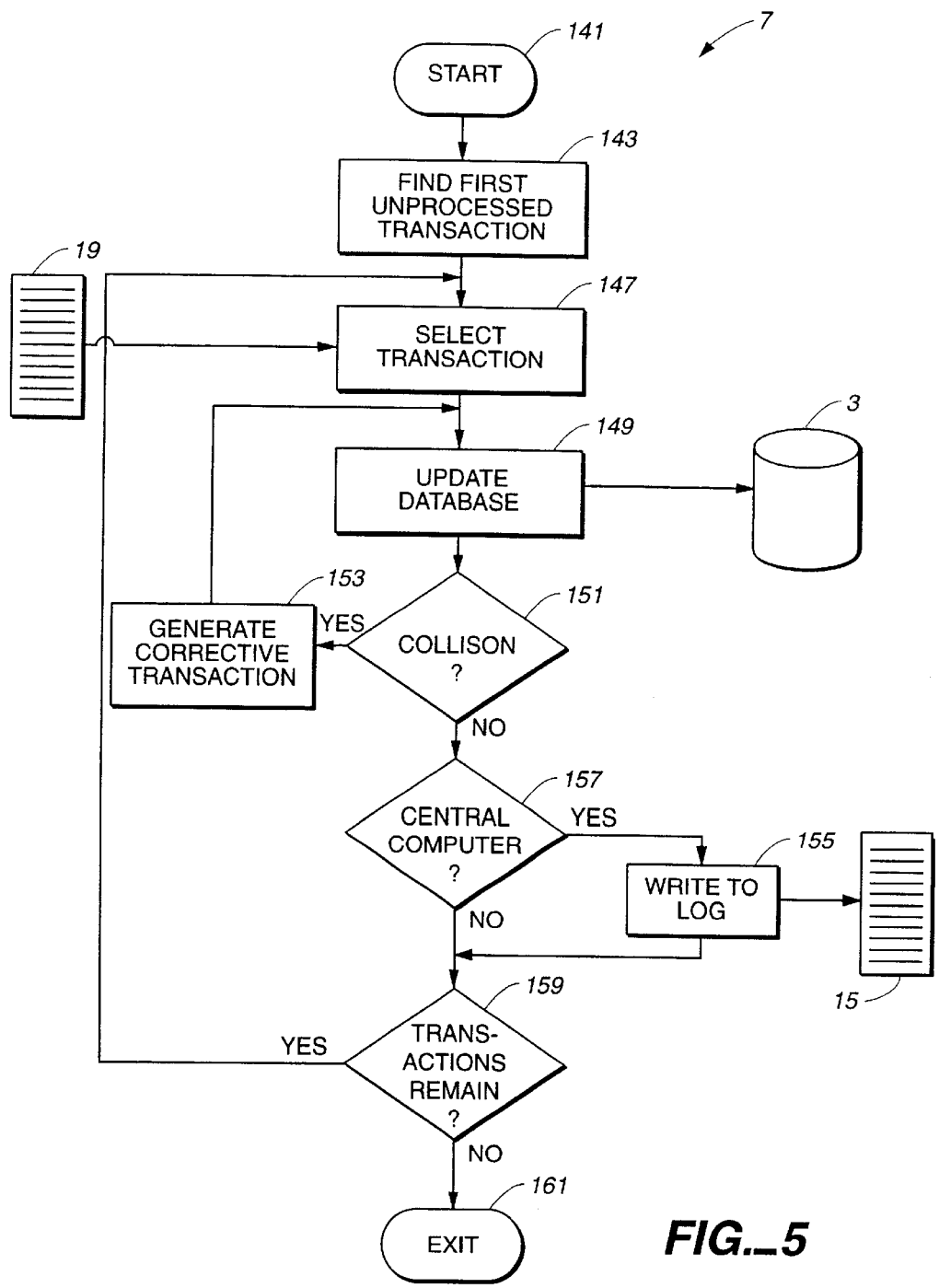
FIG._5

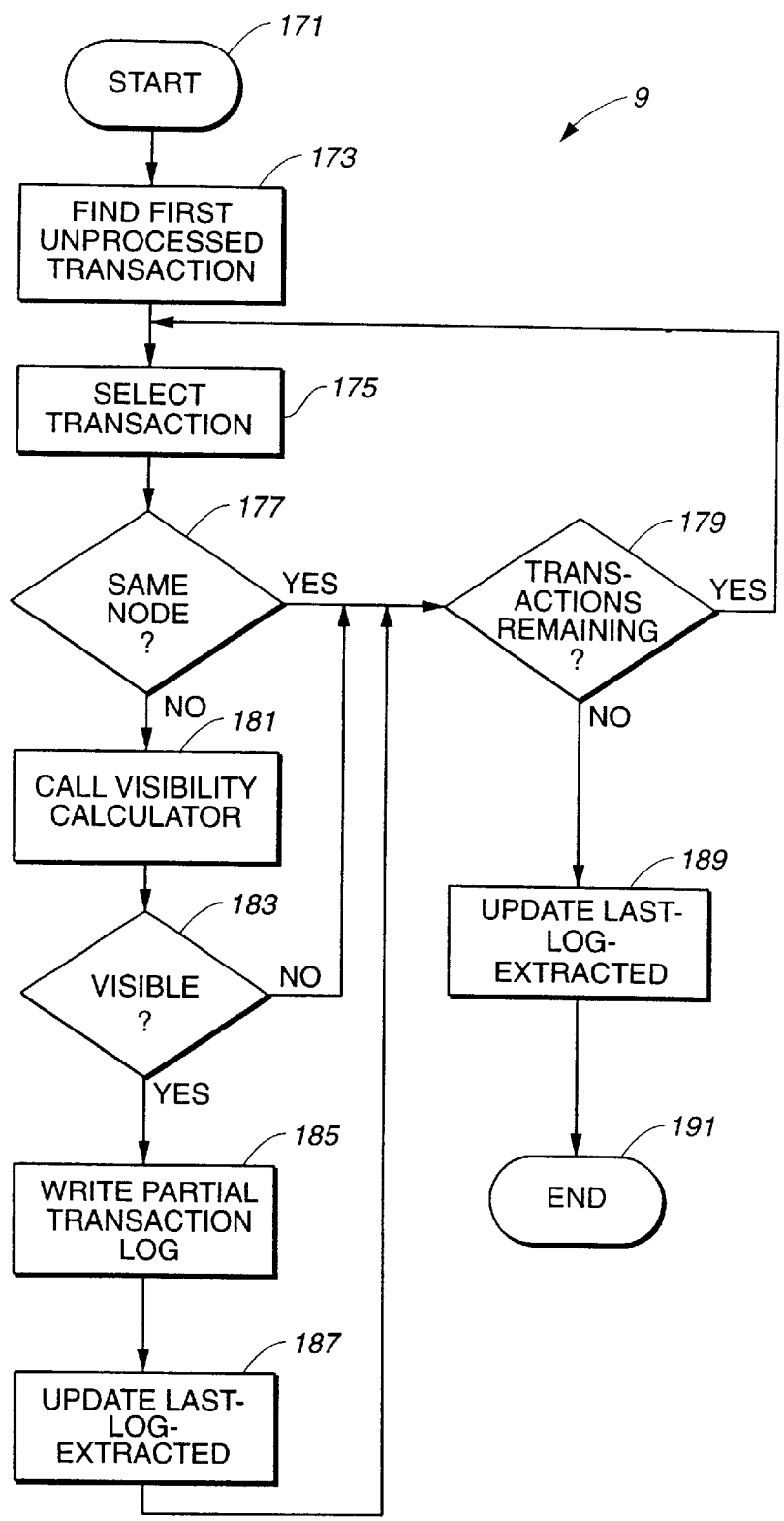
FIG._6

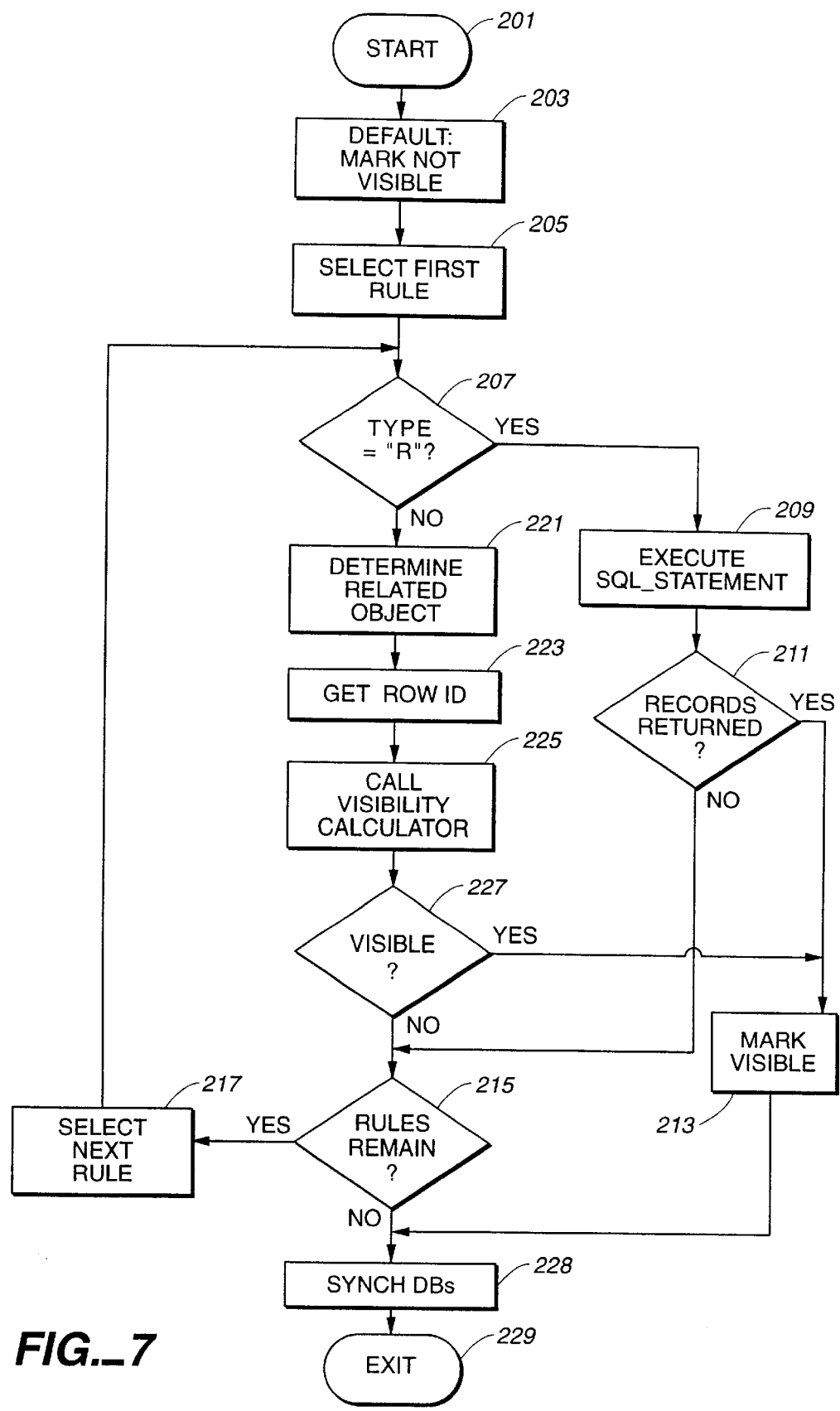
FIG._7

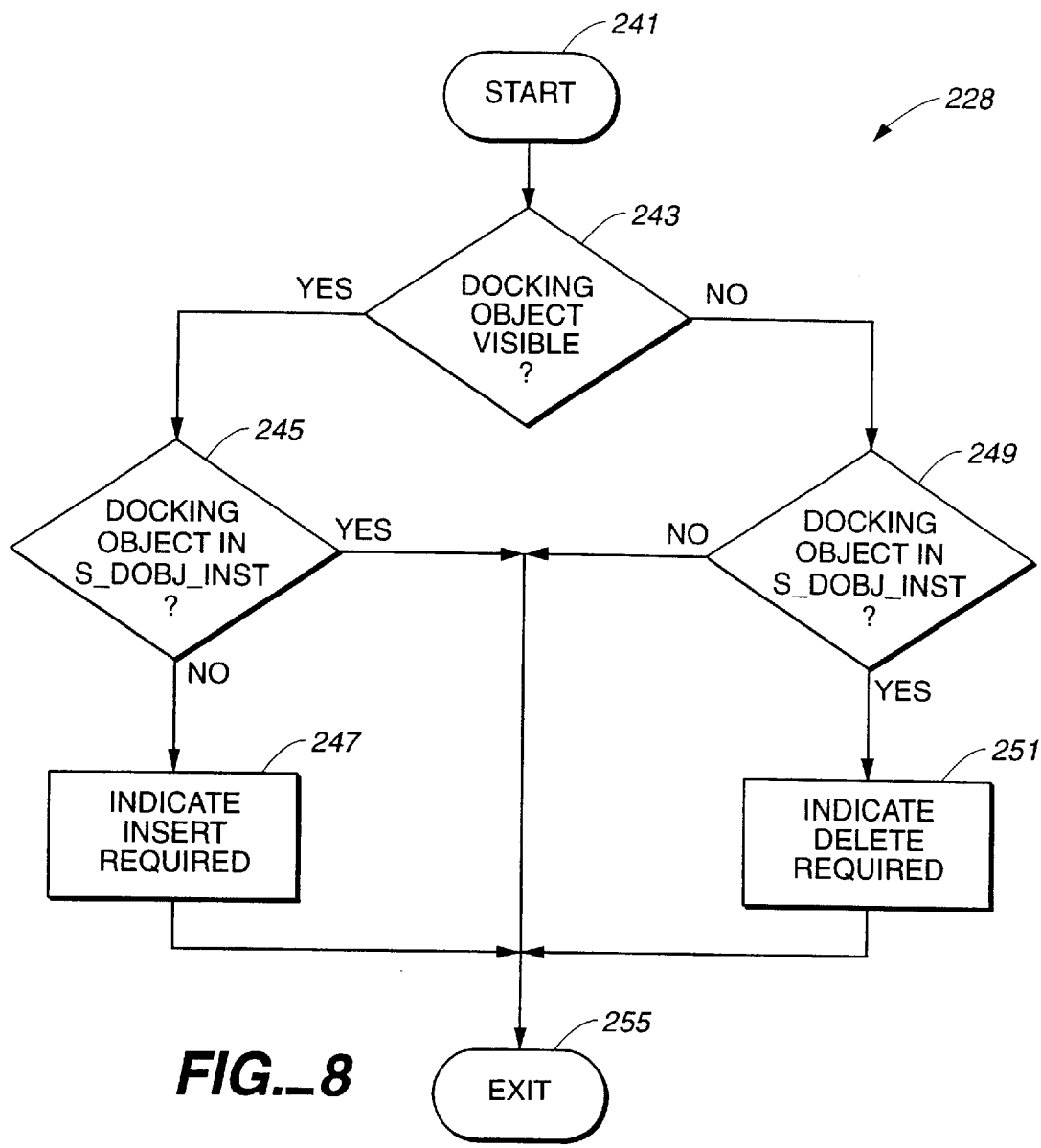
FIG._8

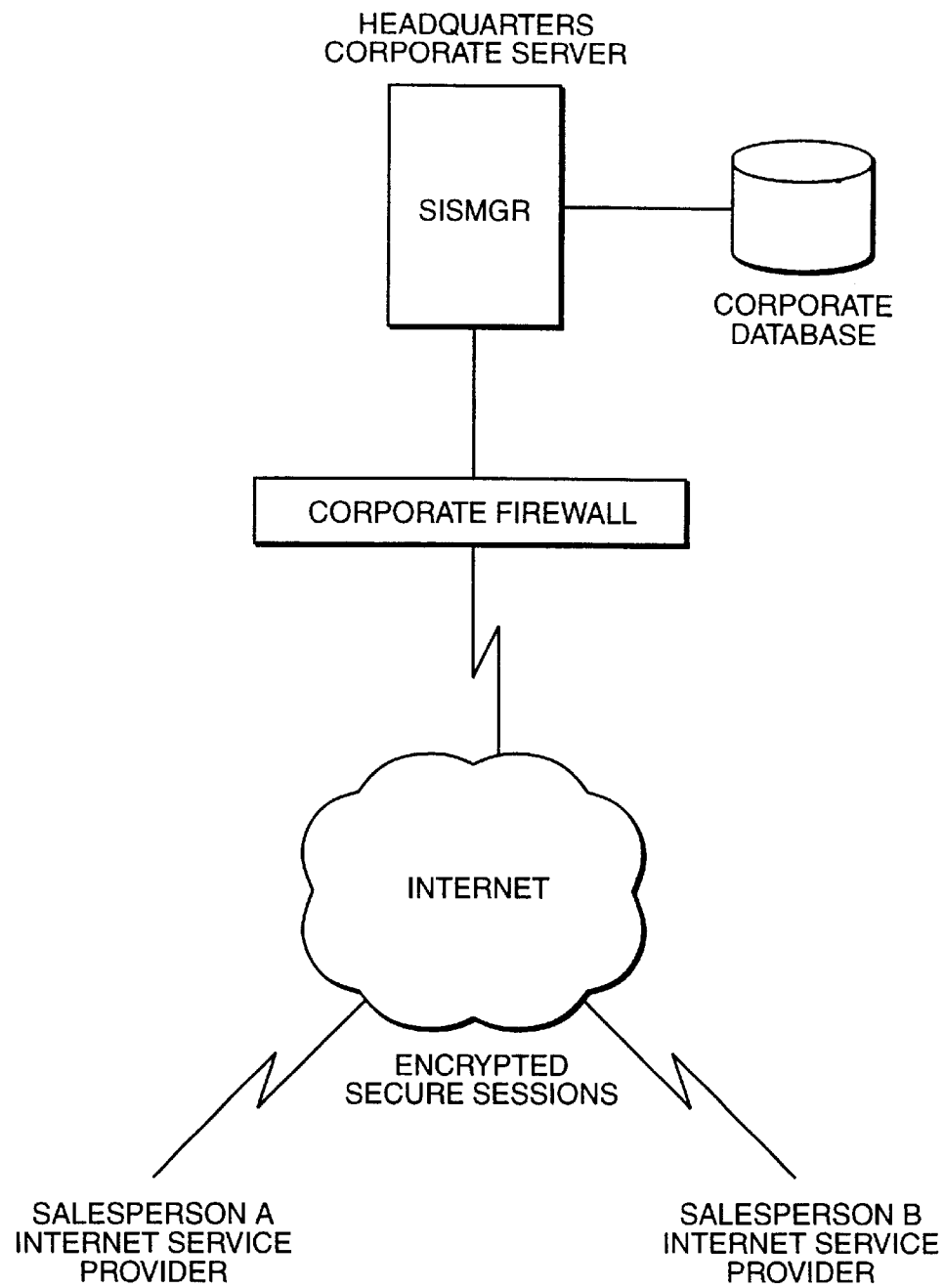
FIG._9

DETERMINING THE VISIBILITY TO A REMOTE DATABASE CLIENT

CROSS REFERENCE TO RELATED APPLICATIONS

This application is a continuation application under the provisions of 35 USC §120 of PCT International Application No. PCT/US98/02756, filed Feb. 24, 1998, itself claiming filing date of U.S. Provisional Application No. 60/039,167, filed Feb. 26, 1997.

TECHNICAL FIELD

This invention relates to a system and method for providing updates to a network of partially replicated relational database systems, and, more particularly, for providing efficient access to a database by a remote client using a networked proxy server.

BACKGROUND

Relational databases are a commonly-employed data structure for representing data in a business or other environment. A relational database represents data in the form of a collection of two-dimensional tables. Each table comprises a series of cells arranged in rows and columns. Typically, a row in a table represents a particular observation. A column represents either a data field or a pointer to a row in another table.

For example, a database describing an organizational structure may have one table to describe each position in the organization, and another table to describe each employee in the organization. The employee table may include information specific to the employee, such as name, employee number, age, salary, etc. The position table may include information specific to the position, such as the position title ("salesman", "vice president", etc.), a salary range, and the like. The tables may be related by, for example, providing in each row of the employee table a pointer to a particular row in the position table, coordinated so that, for each row in the employee table, there is a pointer to the particular row in the position table that describes that employee's position. A relational database management system (RDBMS) supports "joining" these tables in response to a query from a user, so that the user making a query about, for example, a particular employee, may be provided with a report of the selected employee, including not only the information in the employee table, but also the information in the related position table.

Relational databases may be much more complex than this example, with several tables and a multiplicity of relations among them.

With the widespread use of inexpensive portable computers, it is advantageous to replicate a database onto a portable computer for reference at locations remote from the central computer. The replicated database may then be referenced by the user of the portable computer, without requiring reference to the main database, which may be maintained at a central location inconvenient to the user of the portable computer. However, there are a number of difficulties with the use of a replicated database.

One disadvantage is that a fill copy of the central database may require more data storage than is desired or economical. For example, a salesman working in the field may need to refer to the database for information regarding sales opportunities in his sales area, but have no need to refer to any information regarding sales opportunities outside of his area.

One possible approach to reduce the amount of required data storage is to simply replicate only that portion of the database that is needed by the user. However, this approach does not recognize that the criteria to determine which portions of the data are required is likely to vary over time. For example, the salesman may have a new city added to his territory. Under conventional approaches, the salesman would need to re-replicate his local copy of the database, this time selecting data including the added city. Such a practice is inconvenient, subject to error, and time-consuming.

A further disadvantage to a replicated database is the difficulties encountered in attempting to update data using the replicated copy. A change made to the replicated database is not made to the central database, leading to a discrepancy between the information that is stored in the replicated copy of the database and the information that is stored in the central database. Although it is possible to journal modifications made to the replicated copy and apply an identical modification to the central database, one problem that this approach faces is the possibility of colliding updates; that is, where a user of a replicated copy makes a change to data that is also changed by a user of the central copy of by the user of another replicated copy.

It is therefore desirable to provide a capability to maintain one or more partially-replicated copies of a central database, in such a way that the degree of replication may be easily changed without requiring a refresh of the entire replicated database, and that permits updates to be coordinated among users of the central database and users of the partially replicated databases. In addition, it is also desirable to provide access to the central database by the users of the partially replicated databases over a wide area network, so that it is not necessary for each user to call the central database directly. The ability to use the Internet, a commercial online provider's network, or even a corporate intranet, significantly increases the utility of the partially replicated databases by providing excellent connectivity at relatively minimal cost. Further, the software and the replicated databases may be integrated with other services which use the Internet.

SUMMARY OF THE INVENTION

The present invention is directed to a method of maintaining a partially replicated database in such a way that updates made to a central database, or to another partially replicated database, are selectively propagated to the partially replicated database. Updates are propagated to a partially replicated database if the owner of the partially replicated database is deemed to have visibility to the data being updated. Visibility is determined by use of predetermined rules stored in a rules database. In one aspect of the invention, the stored rules are assessed against data content of various tables that make up a logical entity, known as a docking object, that is being updated.

In another aspect of the invention, the stored rules are assessed against data content of one or more docking objects that are not necessarily updated, but that are related to a docking object being updated. In one embodiment, the visibility attributes of the related docking objects are recursively determined.

In yet another aspect of the invention, changes in visibility are determined to enable the central computer to direct the nodes to insert the docking object into its partially replicated database. Such changes in visibility are determined so as to enable the central computer to direct a node to remove a docking object from its partially replicated database.

In a further aspect of the invention, the predetermined rules are in declarative form and specify visibility of data based upon structure of the data without reference to data content.

In still another aspect of the invention, the transactions made to the database are ordered and processed in such a way as to reduce the computational resources required to calculate the visibility of the transactions.

In another aspect of the invention, the transactions are transmitted over the Internet and provided to a networked proxy server which transmits the requests to the central computer for database access.

In yet another aspect of the invention, security and access control are provided for secure transmissions over an insecure network.

These and other aspects of the inventions will become apparent to one skilled in the art by reference to the following drawings and detailed description.

BRIEF DESCRIPTION OF THE DRAWINGS

FIG. 1 depicts an overview of the operation of one embodiment of the present invention.

FIG. 2 depicts a database schema that shows the relationship of the various components that make up a Docking Object.

FIG. 3 depicts steps performed by an update manager to update a database.

FIG. 4 depicts steps performed by a Docking Manager to transmit and/or receive one or more transaction logs.

FIG. 5 depicts the steps performed by a merge processor to merge transaction log records into an existing database.

FIG. 6 depicts the steps performed by a log manager to prepare a partial transaction log.

FIG. 7 depicts the steps performed by a visibility calculator for calculating visibility for a docking object as invoked by a log manager.

FIG. 8 depicts the steps performed to synchronize a partially replicated database in response to change in data visibility.

FIG. 9 depicts the overall structure of a system embodying the present invention using a networked proxy server.

DESCRIPTION OF SPECIFIC EMBODIMENTS

Overview

FIG. 1 depicts an overview of the operation of one embodiment of the present invention. FIG. 1 depicts a central computer system 1 and three remote computer systems (or "nodes") 21-$a$, 21-$b$, and 21-$c$. Each of nodes 21-$a$, 21-$b$ and 21-$c$ are depicted in various states of communication with central computer system 1, as will be more fully explained. Central computer system 1 includes a central database 3, a docking manager 5, a merge processor 7 and a log manager 9. Central computer system 1 additionally optionally includes update manager 11 responsive to user input 13.

Node 21-$a$ is a remote computer system, such as a mobile client such as a laptop computer. Node 21-$a$ includes a partially replicated remote database 23-$a$, update manager 31-$a$ responsive to user input 33-$a$, docking manager 25$a$ and merge manager 27-$a$. In operation, update manager is responsive to user input 33$a$ to make changes to remote database 23$a$ as directed by the operator of node 21-$a$. Updates made are recorded, or journaled, in node update log 35-$a$.

At some point at the convenience of the operator of node 21-$a$, node docking manager 35$a$ is activated, and enters into communication with central docking manager 5. Update log 35$a$ is taken as input by node docking manager 25-$a$, and provided to central docking manager 5. Central docking manager 5 creates a received node update log 19, which contains all the information that had been recorded in update log 35-$a$. Optionally, partial log 17-$a$ is taken as input by central docking manager 5 and provided to node docking manager $^{25}$-$a$, as more fully described herein.

At some point in time, at the convenience of the operator of central computer system 1, merge processor 7 is activated. Merge processor 7 takes as input received node update log 19, and applies the updates described therein to central database 3. In the process of applying the updates from received node update log 19, merge processor journals the updates applied to central update log 15. Optionally, update manager 11, responsive to user input 12 makes additional changed to central database 3 as directed by the operator of central computer system 1. The updates made by update manager 11 are additionally journaled in central update log 15.

At some point in time, at the convenience of the operator of central computer system 1, log manager 9 is activated. Log manager 9 takes as input central update log 15 and produces as output a set of partial logs 17-$a$, 17-$b$ and 17-$c$ according to visibility rules as will be further described herein. Each of partial logs 17-$a$, 17-$b$ and 17-$c$ corresponds to one of nodes 21-$a$, 21-$b$ and 21-$c$. When a node docking manager such as node docking manager 25-$a$ enters into communication with central docking manager 5 and optionally requests transmission of its corresponding partial log, central docking manager 5 takes as input the appropriate partial log, such as partial log 17-$a$, and presents it to node docking manager 25-$a$. Node docking manager 25$a$ then replicates partial log 17-$a$ as merge log 37-$a$.

At some point in the future, at the convenience of the operator of node 21-$a$, merge processor 27-$a$ is activated. Merge processor 27-$a$ takes as input merge log 37-$a$, and applies the updates described therein to partially replicated database 23-$a$.

In addition to node 21-$a$, FIG. 1 also depicts two additional nodes 21-$b$ and 21-$c$. Node 21-$b$ is depicted in communication with central computer 1. However, unlike node 21-$a$, the operator of node 21-$b$ has requested only to send his updates to central computer system 1, and has not requested to be presented with changes made elsewhere to be made to his partially replicated database 23-$b$. This may be, for example, if the operator has an urgent update that must be made as soon as possible, but does not have the time to receive updates from other nodes. Accordingly, FIG. 1 shows only transmission of node update log 35-$a$ from node docking manager 25-$b$ to central docking manager 5, and no transmission from central docking manager 5 to node docking manager 25-$b$. Accordingly, the merge manager for node 21-$b$ is not activated and is not shown.

Likewise, node 21-$c$ is depicted as not in communication with central computer system 1. Accordingly, the docking manager for node 21-$c$ is not activated and is not shown.

By the cycle described above, updates made by each of nodes 21-$a$, 21-$b$ and 21-$c$ are presented to central computer system 1, permitting central database 3 to be updated accordingly. In addition, each of the updates made by each of the nodes 21-$a$, 21-$b$ and 21-$c$, as well as updates made on central computer system 1, are routed back to each of nodes $^{21}$-$a$, 21-$b$, and 21-$c$, thereby keeping each of partial databases 23-$a$, 23-$b$ and 23-$c$ in synchronization with each other and with central database 3.

Database Structure

The synchronization of central database 3 with node databases 23-a, 23-b and 23-c is performed using a construct called a Docking Object A Docking Object consists of Member Tables (including one Primary Table), Visibility Rules, Visibility Events, and related Docking Objects.

A Member Table is a table of the relational database that makes up a docking object. When a docking object is propagated from central database 3 to one of node databases 23-a, 23-b or 23-c, the propagation takes the form of an insertion into each of the Member Tables associated with the particular docking object. Similarly, when a docking object is scheduled to be removed from a database, that removal consists of deleting records from the member tables associated with the docking object. For example, a docking object that represents a sales opportunity may include tables that represent the opportunity itself (e.g., named "S_OPTY"), the product whose sale is represented by the opportunity (e.g., named "S_OPTY_PROD"), the contact for the opportunity (e.g., named "S_OPTY_CONTACT"), etc. Each of these tables is said to be a member table of the "Opportunity Docking Object."

A Primary Table is a Member Table that controls whether a particular instance of a Docking Object is visible to a particular node. The Primary Table has a Primary Row-ID value that is used to identify a row of the Primary Table being updated, deleted or inserted. For example, the "Opportunity Docking Object" may have as a primary table the table S_OPTY. The row-id of that table, i.e., S_OPTY.row_id, is the Primary Row-ID for the Opportunity Docking Object.

A Visibility Rule is a criterion that determines whether a particular instance of a Docking Object is "visible" to a particular node 21. If a Docking Object is visible to a particular node, that node will receive updates for data in the Docking Object. Visibility Rules are of two types, depending on the field RULE_TYPE. A Visibility Rule with a RULE_TYPE of "R" is referred to as an SQL Rule. An SQL Rule includes a set of Structured Query Language (SQL) statements that is evaluated to determine if any data meeting the criteria specified in the SQL statements exists in the Docking Object. If so, the Docking Object is visible to the node. A Visibility Rule with a RULE_TYPE of "O" is referred to as a Docking Object Rule. A Docking Object Rule specifies another Docking Object to be queried for visibility. If the specified Docking Object is visible, then the Docking Object pointing to it is also visible.

A Related Docking Object is a Docking Object that is propagated or deleted when the Docking Object under consideration is propagated or deleted. For example, an Opportunity Docking Object may have related Docking Objects representing the sales contacts, the organizations, the products to be sold, and the activities needed to pursue the opportunity. When an Opportunity Docking Object is propagated from Central Database 3 to one of node databases 23, the related docking objects are also propagated.

FIG. 2 depicts a database schema that shows the relationship of the various components that make up a Docking Object. The schema is a meta-database, in that it does not describe the data being accessed in the database. Rather, the schema is a separate database that defines the structure of the database being accessed. That is, it is a database comprising tables that describe the relationships and data contexts of another database.

Each of the tables shown in FIG. 2 is a table in a relational database, and as such is in row-column form. Many columns represent fields that are common to all the illustrated tables. Such fields include for example, a ROW_ID to identify a particular row in the table, as well as fields to tack the date and time that a row was created and last modified, and the identity of the user who created or modified the row. In addition, each table contains fields specific to that table, and which are described in detail below.

Table S_DOBJ 61 describes the Docking Objects in an application. Table S_DOBJ 61 includes the fields OBJ_NAME and PRIMARY_TABLE_ID. Field OBJ_NAME defines the name of the Docking Object being described. Field PRIMARY_TABLE_ID is used to identify the primary table associated with this Docking Object.

Table S_DOBJ_INST 63 describes whether a particular instance of a Docking Object, described by table S_DOBJ 61, is present on a particular node's database. Table S_DOBJ_INST 63 includes the fields NODE_ID, DOBJ_ID and PR_TBL_ROW_ID. Field NODE_ID points to a particular node table 65. Field DOBJJID points to the Docking Object to which the Docking Object instance applies. Field PR_TBL_ROW_ID is used to select a particular row in the Primary Table of the Docking Object. This value identifies the Docking Object instance.

Table S_REL_DOBJ 67 describes the related Docking Objects of a particular Docking Object, described by table S_DOBJ 61. Table S_REL_DOBJ 67 includes the fields DOBJ_ID, REL_DOBJ_ID, and SQL_STATEMENT. Field DOBJ_ID identifies the Docking Object that owns a particular related Docking Object. Field REL_DOBJ_ID identifies the related Docking Object that is owned by the Docking Object identified by DOBJ_ID. Field SQL_STATEMENT is an SQL statement that may be executed to obtain the Primary ID value of the related Docking Object.

Table S_DOBJ_TBL 69 describes the member tables of a particular Docking Object, described by table S_DOBJ 61. Table S_DOBJ_TBL 69 includes the fields DOBJ_ID, TBL_ID, and VIS_EVENT_FLG. Field DOBJ_ID identifies the Docking Object that contains the member table described by the row. Field TBL_ID identifies the particular table in the database that is the member table described by the row. Field VIS_EVENT_FLG is a flag that indicates whether a change to this Docking Object can result in a visibility event A value of "Y" indicates that a change can result in a visibility event; a value of "N" indicates that it cannot.

Table S_DOBJ_VIS_RULE 71 contains the visibility rules associated with a particular Docking Object. S_DOBJ_VIS_RULE 71 contains the fields DOBJ_ID, RULE_SEQUENCE, RULE_TYPE, SQL_STATEMENT and CHECK_DOBJ_ID. Field DOBJ_ID identifies the Docking Object with which a particular visibility rule is associated. Field RULE_SEQUENCE is a sequence number that indicates the sequence, relative to other visibility rules in table S_DOBJ_VIS_RULE 71, in which the particular visibility rule should be run. RULE_TYPE specifies whether the particular visibility rule is of type "R," indicating an SQL visibility rule or of type "O," indicating a Docking Object visibility rule.

If RULE_TYPE is equal to "R," field CHECK_DOBJ_ID is not meaningful, and field SQL_STATEMENT contains an SQL statement that is evaluated using the Primary ROW-ID of the primary table associated with this Docking Object and a particular Node 21. If the SQL statement returns any records, the Docking Object is deemed to be visible to the Node 21 for which visibility is being determined.

If RULE_TYPE is equal to "O," both field CHECK_DOBJ_ID and field SQL_STATEMENT are meaningful.

Field CHECK_DOBJ_ID specifies a docking object whose visibility should be determined. If the specified docking object is deemed to be visible, then the docking object associated with the visibility rule is also visible. Field SQL_STATEMENT contains a SQL statement that, when executed, returns the Row-ID of the docking object identified by CHECK_DOBJ_ID that corresponds to the docking object instance associated with the visibility rule.

Table S_APP_TBL 73 is an Application Table that describes all the tables used in a particular application. It is pointed to by table S_DOBJ_TBL 69 for each member table in a docking object, and by table S_DOBJ for the primary table in a docking object. S_APP_TBL 73 points to table S_APP_COL 75, which is an Application Column Table that describes the columns of data in a particular application. S_APP_TBL 73 points to table S_APP_COL 75 directly through a primary key and indirectly through such means as a Foreign Key Column Table 81, User Key Column Table 83, and Column Group Table 85. The relationship of an Application Table, Application Column Table, Foreign Key Column Table, User Key Column Table and Column Group Table are well known in the art and are not further described.

Update Processing

FIG. 3 depicts steps performed by an update manager 31 such as update manager 31-*a*, 31-*b* or 31-*c* in updating a database, such as a node database 23-*a*, 23-*b* or 23-*c*, responsive to user input. Execution of update manager 31 begins in step 101. In step 103, the update manager 31 accepts from the user input 33 in the form of a command requesting that the data in database 23 be altered. The request may be in the form of a request to delete a row of a table, to add a row to a table, or to change the value of a cell at a particular column of a particular row in a table. In step 105, using a well-known means, the update manager 31 applies the requested update to database 23. In step 107, the update manager 31 creates a log record describing the update and writes it to update log 35.

The contents of a log record describe the update made. Each log record indicates the node identifier of the node making the update, an identification of the table being updated, and an identification of the type of update being made, i.e., an insertion of a new row, a deletion of an existing row, or an update to an existing row. For an insertion, the log record additionally includes an identifier of the row being inserted, including its primary key and the values of the other columns in the row. For a deletion, the log record identifies the primary key of the row being deleted. For an update, the log record identifies the primary key of the row being updated, the column within the row being updated, the old value of the cell at the addressed row and column, and the new value of the cell.

After writing a log record in step 107, the update processor exits for this update. The foregoing description of the update processing preferably includes additional steps not material to the present invention, for example, to assure authorization of the user to make the update, to stage and commit the write to the database to allow for rollback in the event of software or hardware failure, and the like. These steps are well-known in the art and are not described further.

An update manager 11 executing in central computer system 1 operates in an analogous manner, except that it updates central database 3 and writes its log records to central update log 11.

Docking Processing

FIG. 4 depicts steps performed by a Docking Manager 25 such as Docking Manager 25-*a*, 25-*b* or 25-*c* to transmit and/or receive one or more transaction logs. Docking Manager 25 is invoked by the user of a remote node such as node 21-*a*, 21-*b* or 21-*c*, whereby the user requests that the node dock with central computer 1 to upload an update log such as update log 35-*a* to central computer 1, to download a partial log such as partial log 17-*a*, or both. Execution of Docking Manager 25 begins in step 121. In step 123, Docking Manager 25 connects with central computer 1 under the control of Central Docking Manager 5. This connection can be any connection that enables data exchange. It is anticipated that the most common form of a connection is a telephone line used in conjunction with a modem, but other forms of data connection, such as a Local Area Network or a TCP/IP connection may also be used. Step 125 checks to see whether the user has requested that node update log 35-*a* be uploaded to the Central Computer 1. If so, execution proceeds to step 127. If not, step 127 is skipped and control is given to step 129. In step 127, Docking Manager 25 uploads its update log to central computer 1. The upload may be accomplished with any known file transfer means, such as XMODEM, ZMODEM, KERMIT, FTP, ASCII transfer, or any other method of transmitting data In step 129, Docking Manager 25 checks to see whether the user has requested that a partial log such as partial log 17-*a* be downloaded from Central Computer 1. If so, execution proceeds to step 131. If not, step 131 is skipped and control is given to step 133. In step 131, Docking Manager 25 downloads its partial log from central computer 1. The download may be accomplished with any known file transfer means, such as XMODEM, ZMODEM, KERMIT, FTP, ASCII transfer, or any other method of transmitting data. In step 133, having completed the requested data transfer, Docking Manager 25 exits.

Mere Processing

Merge processing is performed by a processor such as node merge processor 27-*a*, 27-*b*, or 27-*c*, or central merge processor 7. The merge process serves to update its associated database with a transaction that has been entered by a user of a computer remote from the computer where merge processing is being performed. Merge processing is analogous to update processing and is similar in form to update processing as previously disclosed with reference to FIG. 3, with three differences. First, the input to a merge processor is not an update entered directly by a user, but rather is a log file that is obtained from a computer remote from the computer where the merge is executing. A second difference is that, as shown by in FIG. 1, merge processing does not produce a log when performed at a node. The function of a log on a node is to record a transaction for propagation to Central Computer system 1 and thence to other nodes as required. A transaction that is the subject of a merge in a node has been communicated to Central Computer System 1, and there is no need to re-communicate it.

A third difference is that merge processing must be capable of detecting and resolving multiple conflicting transactions. For example, assume that a field contains the value "Keith Palmer." Assume further that a user at node 27-*a* enters a transaction to update that field to "Carl Lake," and a user at node 27-*b* enters a transaction to update the same field to "Greg Emerson." Without collision detection, data among various nodes may become corrupt. When the transaction for user 27-*a* is merged, the field is updated from "Keith Palmer" to "Carl Lake." Without collision handling, when the transaction for node 27-*b* is merged, the field would be updated to "Greg Emerson," and the central database would then be out of synch with the database of node 27-*a*. Furthermore, when merge processing is performed on each of nodes 27-a and 27-b, each node will update its database with the other's transactions, leaving at least one node out of synch with the other node and with central database.

Therefore, merge processing must also have a means of detecting collisions and correcting them. In the above example, a simple way to detect and correct a collision is to compare the value in the database to the value that the merge log reflects as being the previous value in the node database. If the two values do not match, Merge processor 7 may reject the transaction and generate a corrective transaction to be sent to the node from which the conflicting transaction originated. In the above example, when the transaction for node 27-b was presented to merge processor 7, merge processor 7 would compare "Keith Palmer," the prior value of the field as recorded by node 27-b to "Carl Lake," the present value of the field as recorded in central database 3. Detecting the mismatch, merge processor 7 may then generate a transaction to change the value "Greg Emerson" to "Carl Lake," and write that transaction to update log 15. In a subsequent docking operation, that transaction would be routed back to node 27-b to bring its database 23-b in synch with the other databases.

The above is one example of a collision and a resulting corrective action. Other types of collisions include, for example, an update to a row that has previously been deleted, inserting a row that has previously been inserted, and the like. Merge processing must detect and correct each of these collisions. This may be performed using any of a number of well-known methods, and is not discussed further.

FIG. 5 depicts the steps performed by merge processor such as central merge processor 7. Although it depicts merge processor 7 writing to central database 3 and to transaction log 15, it is equally representative of a node merge processor such as node merge processor 27-a, 27-b or 27-c updating a node database 23-a, 23-b or 23-c. Merge processing begins at step 141. In step 143, merge processor 7 finds the first unprocessed transaction on received log 19. In step 147, merge processor 7 selects a transaction from received log 19. In step 149, merge processor 149 attempts to update database 3 according to the transaction selected in step 147. In step 151, merge processor 7 determines whether the database update of step 149 failed due to a collision. If so, merge processor proceeds to step 153, which generates a corrective transaction. Following the generation of the corrective transaction, the merge processor returns to step 149 and again attempts to update database 3. If no collision was detected in step 151, execution proceeds to step 157. In step 157, merge processing checks to see if it is executing on central computer 1. If so, step 155 is executed to journal the transaction to log 15. In any case, either if step 157 determines that the merge processing is being performed on a node or after step 155, execution proceeds to step 159. Step 159 checks to see if any transactions remain to be processed from log 19. If so, execution repeats from step 147, where the next transaction is selected. If not, merge processing exits in step 161.

Log Management

FIG. 6 depicts the steps to be performed by log manager 9 to prepare a partial transaction log such as partial transaction log 17-a, 17-b, or 17-c. The procedure depicted in FIG. 6 is executed for each node available to dock with central computer system 1. Log manager 9 begins execution in step 171. In step 173, Log Manager 9 finds the first unprocessed transaction for the node whose partial transaction log is being prepared. In step 175, log manager 9 selects a transaction for processing. In step 177, log manager 9 checks to see whether the selected transaction originated on the same node for which processing is being performed. If so, there is no need to route the transaction back to the node, and control proceeds to step 179. Step 179 checks to see whether there are any transactions remaining to be processed. If so, control is given again to step 175. If not, control passes to step 189, which records the last transaction that was processed for this node, and then exits at step 191. If the transaction originates in other than the same node as the node for which processing is being performed, control is given to step 181. Step 181 calls a visibility calculator to determine whether the selected transaction is visible to the node being processed. The Visibility calculator routine is described in detail further herein. In step 183, merge processor 9 checks to see whether the visibility calculator determined that the transaction is visible. If it is not visible, control is passed to step 179, which performs as disclosed above. If the transaction is visible, control is passed to step 185. Step 185 writes a record for this transaction to the partial transaction log for the node being processed, for example, partial transaction log 17-a for node 21-a. In step 187, the log manager 9 records the last transaction that was processed for this node, and then passes control to step 179, which determines whether to select additional transactions or exit, as disclosed above.

Visibility Calculation

FIG. 7 depicts a flowchart describing the process a visibility calculator for calculating visibility for a docking object as invoked by step 181 of log manager 9. The visibility calculator is called with the node-id of the node for which visibility is being calculated, the docking object for which the visibility is being calculated, and the row-id of the docking object whose visibility id being calculated. The visibility calculator uses this information, in conjunction with information obtained from meta-data stored in the schema depicted in FIG. 2, to determine whether a particular transaction that updates a particular row of a particular docking object is visible to a particular node.

The Visibility calculator begins execution at step 201. In step 203, the visibility calculator makes a default finding that the transaction is not visible. Therefore, unless the visibility calculator determines that a transaction is visible, it will exit with a finding of no visibility. In step 205, the visibility calculator selects the first visibility rule associated with the docking object. This is done by finding the table S_DOBJ_VIS_RULE 71 associated with the current Docking Object as pointed to by table S_DOBJ 61. In step 205, the visibility calculator selects the row of table S_DOBJ_VIS_RULE 71 with the lowest value for field RULE_SEQUENCE.

In step 207, the Visibility Calculator checks the field RULE_TYPE for a value of "R." The value of "R" indicates that the rule is a SQL visibility rule. If so, the Visibility Calculator proceeds to step 209. In step 209 the Visibility Calculator obtains a SQL statement from field SQL_STATEMET and executes it. An example of such an SQL statement might be:

SELECT 'X' FROM S_OPTY_EMP
WHERE OPTY_ID=:PrimaryRowId
AND EMP_ID=:NodeId;

This SQL statement causes a query to be made of application table S_OPTY_EMP. The query selects any records meeting two criteria. First, the records selected must have a field OPTY_ID, which is a row id or key, equal to the Primary Row-ID of the Docking Object whose visibility is being determined. Second, the records selected must have a field EMP_ID, which may be for example, an identifier of a particular employee, equal to the NodeId of the node for whom visibility is being determined. In ordinary language, this SQL statement will return records only if a row is found in a table that matches employees to opportunities, where the opportunity is equal to the one being updated, and the employee to whom the opportunity is assigned is the operator of the node.

This is a simplistic example, provided for maximum comprehension. More complex SQL statements are possible. For example, the rule:

SELECT 'X' FROM
&Table_Owner.S_ACCT_POSTN ap
&Table_Owner.S_EMP_POSTN ep
WHERE ap.POSITION_ID =ep.POSITION_ID
    AND ep.EMP$_{13}$ ID=:Nodeld;

This rule queries the tables S_ACCT_POSTN (which relates a particular account with a particular position in the organization that is responsible for the account) and S_EMP_POSTN (which relates what employee corresponds to a particular position). The condition "ap.POSITION_ID=ep.POSITION_ID" requires finding a row in the account-to-position table that has the same position as a row in the employee-to-position table. The condition "ep.EMP_ID=NodeId" further requires that the selected row in the employee-to-position table also have an Employee ID equal to the ID of the user of the Node for which visibility is being determined. In ordinary language, this condition allows visibility if the employee occupies the position that has responsibility for the account in the docking object being updated.

There is no particular limit to the complexity of the conditions in the SQL statement used to evaluate visibility. Particular implementations of SQL may impose limitations, and resource considerations may make it desirable to use less complex statements, but these limitations are not inherent in the invention.

Step 211 evaluates whether the execution of SQL_STATEMENT in step 209 returned any records. If records were returned, this indicates that the Node for which visibility is being checked has visibility to the docking object being processed. Accordingly, if records are returned, the Visibility Calculator proceeds to step 213. In step 213, the transaction is marked visible. Because no further rules need to be evaluated to determine visibility, the visibility calculator proceeds to step 228. Step 228 synchronizes the databases by determining whether the calculated visibility requires the insertion or deletion of a docking object into a particular node's partially replicated database. This may occur, for example, if a node is determined to have visibility to a docking object due to a change to a related docking object. For example, an owner of a node may be assigned to a particular activity that is related to a particular sales opportunity. As a result, the node should be provided with a copy of the object representing the sales opportunity.

FIG. 8 depicts the steps performed to synchronize a partially replicated database in response to a change in data visibility. Execution begins in step 241. In step 243, the Visibility Calculator references the visibility just calculated for a docking object. If the Docking Object is visible, execution proceeds to step 245. Step 245 references the S_DOBJ_INST table, to verify that a row exists for the Docking Object for the current node. If a row exists, this indicates that the node in question already has a copy of the referenced Docking Object, and the routine proceeds to step 255, where it exits. If, however, no row exists for the Docking Object at the node being processes, this indicates that the node in question does not have a copy of the Docking Object on its partially replicated database. The routine then proceeds to step 247, where a transaction is generated to direct the node to insert the Docking Object into its partially replicated database.

If step 243 determines that the Docking Object is not visible, execution proceeds to step 249. Step 249 references the S_DOBJ_INST table, to verify that no row exists for the Docking Object for the current node. If step 243 determines that no row exists in the S_DOBJ_INST table for the current docking object for the current row, this indicates that the node in question does not have a copy of the referenced Docking Object, and the routine proceeds to step 255, where it exits. If, however, a row exists for the Docking Object at the node being processed, this indicates that the node in question does have a copy of the Docking Object on its partially replicated database. The routine then proceeds to step 251, where a transaction is generated to direct the node to delete the Docking Object from its partially replicated database.

Referring again to FIG. 7, following the data synchronization routine of step 228, the Visibility Calculator proceeds to step 229, where it exits. Referring to FIG. 6, as previously described, the resulting finding of visibility is available to be checked by the log manager in step 183 to determine to write the transaction.

Referring again to FIG. 7, if step 211 determines that no records were returned by the execution of the SQL statement in step 209, execution proceeds with step 215. Step 215 checks to see whether there are any remaining visibility rules to be assessed. If not, the visibility calculator proceeds to step 228 to synchronize the database, and then to step 229, where it exits. In this case, the default mark of no visibility that was set in step 203 remains set. This value will also be used by the log manager as shown in FIG. 6, step 183, to determine not to write the transaction.

Referring again to FIG. 7, if rules remain to be assessed, control proceeds to step 217, which selects the next rule to be processed. Control is then given again to step 207 to begin processing the new rule.

The preceding text provided a description of the processing or SQL visibility rule; that is, visibility rules of type "R." If step 207 determines that the visibility rule is not of type "R," the visibility rule is of type "O." Type "O" indicates a docking-object visibility rule. In such a case, the docking object being processed will be considered to be visible if it is related to a particular related docking object that is visible. If field RULE_TYPE is not equal to "R." then. execution proceeds to step 221. Step 221 determines the related Docking Object whose visibility must be determined to determine whether the current docking object is visible. The related Docking Object identifier is obtained from field CHECK_DOBJ_ID in table S_DOBJ_VIS_RULE 71. In step 223, the Visibility Calculator determines which row in the related Docking Object must be queried for visibility. In order to determine this, the Visibility Calculator obtains a predetermined SQL statement from the field SQL_STATEMET and executes it. The SQL statement is a query that select one or more rows of the Docking Object that, for example, correspond to the docking object for which the Visibility Calculator was invoked.

For example, assume that it is desired to indicate that a record for a sales opportunity should be visible if the Node has visibility to any sales quote made for that sales opportunity. This may be accomplished using the following SQL statement:

SELECT"_ID" FROM
    &Table_Owner.S_DOC_QUOTE
    WHERE OPTY_ID=:Primary Rowld

This SQL statement accesses a table S_DOC_QUOTE that contains all sales quotes. The WHERE clause specifies retrieval of all rows where the Opportunity ID of the row is equal to the Row-ID of the opportunity for which visibility is being calculated. The Visibility manager retrieves the specified Row-Ids, thereby identifing the rows of the S_DOC_QUOTE table whose visibility must checked.

Having determined the a related docking object and the row-ID of that related docking object upon whose visibility the visibility of the current docking object depends, the Visibility Calculator proceeds to step 225. In step 225, the Visibility Calculator recursively invokes itself to determine visibility of the related docking object. The recursively invoked Visibility Calculator operates in the same manner as the Visibility Calculator as called from the Log Manager 9, including the capability to further recursively invoke itself. When the recursive call concludes, it returns a visibility indicator for the related Docking Object, and control proceeds to step 227. In step 227, the Visibility calculator determines whether the related Docking Object was determined to have been visible. If so, the Visibility Calculator proceeds to step 213 to mark the originally current Docking Object as visible, and then to step 228 to synchronize the database and then to step 229 to exit. If the related Docking Object was not determined to be visible, control proceeds to step 215 to determine whether additional visibility rules remain to be assessed.

The Visibility Calculator, in conjunction with the Log Manager is therefore able to determine what subset of update transaction data is required to be routed to any particular node. This operation serves to reduce the transmission of unneeded data from the Central Computer 1 to the various nodes such as nodes 21-a, 21-b and 21-c that utilize partially replicated databases, and to reduce the system resources such as disk space needed to store, and the CPU time needed to process, what would otherwise be required to maintain a fully replicated database on each remote node.

The operation of the log manager 9 in conjunction with the Visibility Calculator herein described will be apparent from reference to the description and to the drawings. However, as a further aid in the description of these facilities, a pseudocode representation of these facilities is hereto attached as an Appendix.

Internet Session Manager

The following terms will be used in describing the Internet Session Manager:

SISM: Siebel Internet Session Manager (also referred to as Internet Session Manager).

SISMGR: The application server which implements SISM (the program itself).

SIS API: The client-side application programming interface for communicating with the SISM server.

The Internet Session Manager provides database functionality and access to mobile clients that are connecting via a wide area network such as the Internet, a corporate intranet, or a commercial online provider. The functionality and access thus provided to mobile clients is comparable to that of clients connected to the central database via a local area network. The Internet Session Manager also provides security for data that flows between the client and the database, as will be described herein.

Overview of Internet Session Manager

SISMGR is a new application server process which currently runs on Windows NT, but may be ported to later versions of Windows NT and to UNIX. One or more instances of SISMGR run continuously on a machine to accept connections from remote clients. Each client connection "into" SISMGR corresponds to a database connection "from" SISMGR, which essentially acts as the connector between the client and the database. Thus, a machine running SISMGR is configured as a networked proxy server. The overall structure of system using the Internet Session Manager is shown in FIG. 9. SISMGR has several advantages over a direct SQL connection such as Oracle's SQL*Net):

1. Security for data which flows between the client and server.
2. True access control for client authentication.
3. Central monitoring and control of remote access.

Data Security

SISMGR addresses several methods of intercepting the data transferred between the client and SISMGR:

4. No one besides the two parties (mobile client and SISMGR) should be able to read the contents of the transmissions.
5. No one should be able to alter the data during transmission and have the results accepted.
6. No one should be able to replay parts of a previous transmission and have the results accepted.

These three types of attacks are primarily addressed through encryption. Encryption techniques fall into two basic categories: public key and private key cryptography. Private key cryptography uses a key which must be kept secret (hence the "private"), and is very secure as long as the key is not compromised. Encryption and decryption are rapid, and private key encryption is used to transmit the bulk of the data in secure systems. Public key cryptography techniques provide encryption and decryption through a pair of keys, designated as the "private key" and the "public key" (although they are interchangeable). The power of this technique is that one key can be given to the world and one kept secret. The "trick" of public key cryptography is that data encrypted with the public key can only be decrypted with the private key and vice versa. Thus a message can be encrypted (with the public key) which can only be decrypted by the intended recipient and a message can be verified as having been sent by a person if it can be decrypted with that person's public key. Further discussion may be found in "PGP: Pretty Good Privacy" by Simson Garfinkel, and U.S. Pat. Nos. 4,405,829, 4,218,582, 4,424,414, and 4,200,770, the disclosures of which are hereby incorporated by reference.

SISMGR uses a session key and sequencing to provide a secure communication channel. The first packet sent by the client contains the client's public key, which can be verified by the server against an internal database or trusted certification authority (CA). The server reply contains a session identifier (unique for each communication session) and a session private key (randomly generated by the server) and will be encrypted with the client's public key. All further messages in both directions are encrypted with the session key using private key cryptography. All messages will contain the non-repeating session identifier allocated by the server, which prevents messages from being replayed in another session. Each message in a session has a monotonically increasing identifier to prevent messages from being replayed in or removed from the session.

Access Control

In addition to preventing communications between legitimate users from being intercepted, it is necessary to prevent illegitimate users from gaining access to SISMGR. This is especially important in implementations where all Visibility Rule checking is performed by the client and access to SISMGR provides fill access to the corporate database, but is still of importance in implementations where Visibility Rule checking is performed by the Central Computer 1.

Access control prevents both illegitimate use of the Siebel client application as well as special programs which pretend to be clients. As in all security systems, the weak link is keeping the private key from getting out. Thus, the private key is stored in encrypted form on the user's laptop, and the user must enter a password (or phrase) to unlock his/her private key. Otherwise, anyone with access to the laptop would have access to the corporate database. The user must still enter his/her database name and password to actually log in.

One skilled in the art will recognize that hardware-based authentication schemes, such as those which use PCMCIA or flash memory cards to hold the keys and possibly perform the encryption, may be used without departing from the spirit or scope of the present invention.

Monitoring and Control

The SISMGR keeps a list of hosts which are allowed to connect. Connections from hosts or network addresses which are not listed will be rejected. This helps avoid attacks from systems which should not have access. An access control list is of particular utility on an intranet where all points of access are known in advance. Further details of the access control list will be described below.

In an alternative embodiment of the invention, SISMGR may include security auditing tools which check for patterns of behavior which might indicate attacks on the system, such as logins outside typical working hours, many failed login attempts, or sessions with atypical query patterns. Further, there could be a mechanism for evaluating the load and response time for clients, to enable system administrators to ensure good throughput at peak times.

Architecture

The functionality of the Internet Session Manager is implemented in a common DLL (ssasis30.dll) and a number of connector DLLs (such as ssx30o72.dll for Oracle). A simple executable wraps this functionality to produce a server. SISMGR is a main routine which links in and initializes the SISM DLL and displays errors on the console. In another embodiment, this functionality may be implemented as a Windows NT service which has no user interface at all.

Also part of the SISM functionality is the "SIS network API," also a DLL (ssasna30.dll) which encodes and decodes the messages which flow back and forth between the mobile client and the SISMGR. The actual messages, their parameters, and the actual format of the data are all defined in the SIS network API.

As will be described below, the present embodiment of the invention defines a set of messages which allow the client to implement a connector which executes its SQL operations using the SIS network API to talk to the SISMGR. However, the architecture may be extended to provide further functionality for mobile clients. For example, an "object manager" server may be used to implement a "thin client" interface and even alternate clients.

This implementation essentially moves the actual database connection (the code which talks to the database vendor APIs) out of the client process and into the SISMGR process. This permits the imposition of additional restrictions and provides complete central control over the data which passes across the connection between the client and the database server.

SISMGR provides a session-oriented protocol as part of the security setup. The first message sent by a client must be a HELLO message, which establishes the client authentication and creates a session ID which is used by all remaining requests in this session. The details of the HELLO message (and all other messages) can be found in the sisnapi.h header file below.

SISMGR supports direct SQL access messages which provide direct support for the client connector operations. The messages in this group all translate directly into database operations, although a single message may logically correspond to multiple database API calls. Before any other SQL operations can be performed, the user must log into the SQL database. This is done with the LOGIN message, which takes database connection information. The LOGOUT message terminates a login session. Only a single login session may be active at once for a client Actual SQL statements are always executed against a "statement context." This statement context corresponds to an ODBC HSTMT or an Oracle cursor. (ODBC, or Open DataBase Connectivity, is a specification for an API that enables applications to access multiple database management systems using SQL. HSTMT a statement handle.) Before an actual SQL statement can be executed, a statement must be allocated with the ALLOCSTMT message (which returns a HSTMT). Statements can be freed with the FREESTMT message or simply re-used for another SQL statement These statement IDs must be specified for executing statements and fetching rows.

The EXEC message is used to execute a SQL statement (usually a DML, or Data Manipulation Language, statement) one or more times with different bind variables. Because no output is returned from the statement, this cannot be used for queries. However, the ability to re-execute the statement for each set of bind variables is very useful for reducing round trips for repetitive operations. The QUERY and FETCH messages provide query support. QUERY is sent to begin a new query statement and return the first batch of results. FETCH is used to get the next batch of results. The size of the result set can be specified in QUERY to limit the number of rows fetched by each request. The COMMIT and ROLLBACK messages are provided to commit and roll back database transaction operations. The EXEC message can also request that a commit be performed if the operation is successful without requiring an explicit COMMIT message be sent.

To support literature and correspondence (fulfillment), SISMGR provides simple file services. Basic file-oriented operations can be performed for files by specifying file names relative to the root directory configured into the SISMOR. Information about files can be obtained by using the FILEINFO message, which returns standard file information but does not actually open the file. To open a file and allocate a "file ID" which is used by the other operations on this section, the FILEOPEN message is used. FILEOPEN returns roughly the same information as returned by FILEINFO, plus the file ID. Files are closed after use with the FILECLOSE message. Files are read from and written to using the FILEREAD and FILEWRITE messages. These operate very similarly to the standard file operations and their use is well known in the art. In the present embodiment, one restriction is that a file may only be opened for reading or writing, not both. Opening a file for write always truncates the existing contents (if any) and creates the file if it does not exist.

Also provided are high-speed (tuned) connectors for the different databases as part of SISM, in the same way that these connectors are provided in the client. The SISM connectors are simpler than the client connectors because they do not need to know how to format statements. They need only execute them, collect results, and handle errors.

The abstract class CSSSISDbConn (declared in sismcon.h) defines the template which each connector function must follow, and defines the interface which database-specific connectors must implement to support the SISM client database operations. The templates correspond roughly to the ANSI cursor model, but with some compression to reduce round trips. The data passed to the functions is taken directly out of the messages with little translation by SISMGR, but the connectors are not themselves dependent on the message format.

An instance of a subclass of CSSSISDbConn is created for each client connection when it attempts to log in. The client passes information about which database it wants to log into and the user name and password of the user to log in as. SISMGR maps the requested "database" into the database-specific information as it validates the request.

Each client request is translated into one or more calls to this API, which is structured slightly differently from the messages for simplicity. The main goal of the message API is to minimize round trips. The main goal of the connector API is to be easy to implement.

SISMGR is a multi-threaded program, and each client instance runs in its own thread. As is the case everywhere else in SISMGR, the connector implementations must be careful to be multi-threading-safe. If necessary, synchronization objects implemented in SISMGR can be used, but this will probably reduce throughput when many clients are connected.

Further details of CSSSISDbConn, related code, and the functionality may be seen in the following sismconb code:

```
// FILE:     sismcon.h
// DESCRIPTION
//    Generic DB-specific connector class for Internet Session Manager.
#ifndef __SISMCON_H__
#define __SISMCON_H__
#ifndef __SISNAPI_H__
   #include "sisnapi.h"
#endif
class CSSSISDbStmt;
#define MAX_NUM_STMTS   256
class SS_EXPORT_CLASS CSSSISDbConn : public CSSSISObject
{
protected:
      BOOL              m_bConnected;
      CSSSISDbStmt*     m_dbStmtArray [MAX_NUM_STMTS];
public:
      //
      // When the client sends a LOGIN request, the Login method is called
      // this should perform any database-specific login operations and
      // return an appropriate error status. Logoff performs the reverse
      // operations and frees all resources associated with the previous
      // login.
      //
      // Note that since there is an instance of a concrete sub-class of
      // CSSSISDbConn for each client, the database login is one-to-one
      // with the instance of CSSSISDbConn. Thus both session and login
      // information should be stored in members of the sub-class.
      //
      virtual BOOL      DoLogon    (const char* pInstance,
                                    const char* pUserName,
                                    const char* pPassword) = 0;
      //
      virtual BOOL      Logon      (const char* pInstance,
                                    const char* pUserName,
                                    const char* pPassword);
      virtual BOOL      DoLogoff   (void) = 0;
      virtual BOOL      Logoff     (void);
      //
      // The statement executing APIs parallel the SISM request messages
      // closely. The Execute call prepares a SQL statement and then
      // executes it a specified number of times, each time with a
      // different set of bind variables. If no bind variables are
      // given, the statement should be executed once.
      //
      // No output values are expected from the Execute statement and
      // no persistent cursor information should be maintained. The
      // number of rows affected (a sum of all executions) should be
      // returned to the caller through the last parameter.
      //
      virtual BOOL      Execute    (SISStmtId              stmtId,
                                    CSSSISColRowData*      pIBinds,
                                    int&                   numAffected);
      virtual BOOL      ExecuteAndFetch  (SISStmtId              stmtId,
                                          CSSSISColRowData*      pIBinds,
                                          CSSSISColRowData*&     pFetched,
                                          int&                   numFetched);
      //
      // For statements which return output (SELECT statements), we use
      // the ANSI model of preparing the statement and executing it and
      // then fetching results. The prepare must open a cursor which
      // is returned to the caller for future calls to Fetch and finally
      // a call to Close.
```

-continued

```
//
// The fetch function takes an argument of the number of rows to
// fetch (at most) and an indicator for whether this drains the
// cursor. This information is returned to the client.
//
    virtual BOOL        Prepare      (SISStmtId          stmtId,
                                      const char*        pStmt,
                                      CSSSISColRowData*  pOBinds,
                                      int                nMaxFetch);
    virtual BOOL        Fetch        (SISStmtId          stmtId,
                                      CSSSISColRowData*& pFetched,
                                      int&               numFetched,
                                      BOOL&              bEOF);
    virtual BOOL        AllocStmt    (SISStmtId&         stmtId) = 0;
    virtual void        DoFreeStmt   (CSSSISDbStmt*      pDbStmt) = 0;
    virtual BOOL        FreeStmt     (SISStmtId          stmtId);
//
// For maintaining the transaction state, the Commit and Rollback
// methods perform the DB operations.
//
    virtual BOOL        Commit (void) = 0;
    virtual BOOL        Rollback (void) = 0;
    virtual void        Release (void) = 0;
protected:
                        CSSSISDbConn (void);
    virtual             ~CSSSISDbConn (void);
private:
    BOOL GetStmt        (SISStmtId          stmtId,
                         CSSSISDbStmt*&     pDbStmt);
};
class SS_EXPORT_CLASS CSSSISDbStmt: public CSSSISObject
{
protected:
    CSSSISDbConn*       m_pDbConn;
    CSSSISColRowData*   m_pOutputBindColData;
public:
                CSSSISDbStmt        (CSSSISDbConn* pDbConn);
    virtual     ~CSSSISDbStmt       (void);
    virtual BOOL        DoExecuteAndFetch (CSSSISColRowData* pIBinds,
                                           int& numFetched) = 0;
    virtual BOOL        DoFetch       (int& numFetched,
                                       BOOL& bEOF) = 0;
    virtual BOOL        DoPrepare     (const char* pStmt,
                                       CSSSISColRowData* pOBinds,
                                       int nMaxFetch) = 0;
    virtual BOOL        Execute       (CSSSISColRowData* pIBinds,
                                       int& numAffected) = 0;
            BOOL        ExecuteAndFetch (CSSSISColRowData* pIBinds,
                                         CSSSISColRowData*& pFetched,
                                         int& numFetched);
            BOOL        Fetch         (CSSSISColRowData*& pFetched,
                                       int& numFetched,
                                       BOOL& bEOF);
            BOOL        Prepare       (const char* pStmt,
                                       CSSSISColRowData* pOBinds,
                                       int nMaxFetch);
};
// Each DLL which implements a specific database connector must have
// an exported function named CreateSISDbConn which takes as its single
// argument a reference to a CSSSISDbConn* into which it will return
// the constructed instance of a sub-class of CSSSISDbConn.
//
// The typedef here gives the format of the function which must be
// implemented by the connector. All other methods implemented by
// the connector are done as methods on the constructed CSSSISDbConn
// instance.
//
typedef BOOL (*SIS_CREATE_FN) (CSSSISDbConn*&);
#endif // !_SISMCON_H_
```

One important data structure defined in the SIS network API is CSSSISColRowData (declared in sisnapi.h) which is the buffer which holds rows and columns of data input bind variables to SQL statements and rows of data output by a query. For efficiency, these data structures are passed directly back and forth between the connector methods and the messages sent and received by SISMGR. This avoids excess data copying. Further details of CSSSISColRowData and other information will be apparent from inspection of sisnapi.h, which defines the structure of messages that flow back and forth between the client and the SISM server. The protocal is structured as request/reply (remote procedure call). The client may implement a non-blocking model to avoid "locking up" while waiting for the reply, but a simple client implementation could treat these as regular procedure calls, not requiring a major change in architecture.

The messages have a simple format common format made up of a constant header and an optional list of attributes. The attributes are message specific and list the elements of the message which are required.

At the lowest level, all data are represented as either integers or strings. All integer data are in "network byte order" to avoid interpretation problems on heterogeneous architectures. All string data are an array of bytes (which may include the NUL byte), although usually these will be true C strings which are NUL terminated. Strings are always byte-oriented since the data is not byte swapped for transmission.

The length of the header and the length of the body are both explicitly given. This allows for advances in the protocol to be made without breaking older implementations (unless desired) as long as new fields are appended to the existing messages.

The request, and associated replies contain the header plus additional information. All negative acknowledgement NAK) messages have the same format: a generic error code (defined in sisnapi.h) and optional detail information.

When the message is actually transmitted, the entire message (both the header and body) are compressed and encrypted (except for the HELLO request and NAK messages and the NOACCEPT notify message). Because of this, the length of the entire message (after compression and encryption) are sent as a SISUInt32 (in the clear) immediately before the message data and are not included in the header length.

In order to make it easier for the client and server to construct and parse the messages sent back and forth, a set of classes are given to pack and unpack the messages and perform the compression and encryption as necessary. The abstract superclass of these is CSSSISMessage, which has four subclasses (one for each message type). Following is the sisnapi.h file, showing the details of the CSSSISMessage and other structures.

```
// FILE:     sisnapi.h
// DESCRIPTION
//
//   Public header file for the Siebel Internet Session message API.
#ifndef _SISNAPI_H_
#define _SISNAPI_H_
class CSSSISColRowData;
enum SISMessageType
{
    SIS_MSG_UNKNOWN   = 0,
    SIS_MSG_REQUEST   = 1,    // client request message
    SIS_MSG_ACK       = 2,    // server success message
    SIS_MSG_NAK       = 3,    // server failure message
    SIS_MSG_NOTIFY    = 4     // server status message
};
enum SISRequestCode;
class SS_EXPORT_CLASS CSSSISMessage
{
public:
    SISMessageType            GetType () const
                                   { return m_type; }
    //
    // Methods for constructing a message.
    // Firstly, the message type is given, which allows the header to be
    // constructed. Then, data is added according to the actual contents
    // of the message.
    //
protected:
    BOOL              Add_int       (unsigned int   value);
    BOOL              Add_str       (const char*    pStr);
    BOOL              Add_str       (const char*    pBuf,
                                     int            nLen);
    BOOL              Add_crd       (CSSSISColRowData*
                                     pCRD);
public:
    virtual BOOL      Encode (SISMessageType);
    BOOL              Complete ();
    unsigned char*    GetData () { return m_pDataBuf; }
    int               GetLength () const { return
                                     (m_pDataPtr -
m_pDataBuf); }
```

The sisnapi.h file also defines methods for unpacking a message. The message data is given, from which the message contents will be extracted. The CopyData method makes a copy of the given buffer while TakeData just keeps a pointer to the passed buffer and will free it when the message is deleted.

```
public:
    BOOL              CopyData      (unsigned char*  pData,
                                     int             nLen);
    BOOL              TakeData      (unsigned char*  pData,
                                     int             nLen);
    void              DropData      ();
    virtual BOOL      Decode ();
public:
                      CSSSISMessage ();
    virtual           ~CSSSISMessage ();
    void              Release ();
protected:
    BOOL              Get_int       (unsigned int*   pBuf);
    BOOL              Get_str       (char**          ppData,
                                     int*            pLen);
    BOOL              Get_crd       (CSSSISColRowData**
                                     ppCRD);
private:
    SISMessageType    m_type;
    unsigned char*    m_pDataBuf;
    unsigned char*    m_pDataPtr;
    int               m_nBufSize;
    int               m_nHeaderLen;
    unsigned char*    m_pBodyLen;
    BOOL              Extend (int nNeedBytes = -1);
};
```

Further provided are functions to connect to the SISM server (or any TCP/IP server). These functions do not transmit or receive any data. They simply construct and tear down the TCP/IP connection. SISConnectServer returns a socket identifier which is passed to SISSendMessage and SISReadMessage to actually transmit and receive message data. Only a single server session created by SISConnectServer may be outstanding at any one time. This is because there is only a single buffer used by SISReadMessage for collecting the input as it arrives on the socket.

The function SISIsConnBroken may be called to return the status of the connection. If it returns TRUE, no more messages can be read or sent over this connection, and a new connection must be established (or the client should terminate).

```
//
extern int SS_EXPORT_API SISConnectServer      (const char*   pHostName,
                                                int           nInetPort);
extern void SS_EXPORT_API SISDisconnect (int nSocketId);
extern BOOL SS_EXPORT_API SISIsConnBroken   (int nSocketId);
```

Security is also provided for SISMGR in the sisnapi.h file. The client transmits its public key using SISCryptGetPublicKey( ) in the HELLO message, in the clear. The server generates a session key and exports it, encrypted with the client's public key using SISCryptGenSessionKey( ), and sends it back in the HELLO ACK, also in the clear. The HELLO and the HELLO ACK are the only messages in the clear. All other messages are encrypted with SISCryptEncrypt( ) and decrypted with SISCryptDecrypt( ), using the session key. SISCryptInitialize( ) is called by the client before the HELLO message and by the server before the HELLO ACK to initialize the cryptography session. If required, a key container is created and a public key generated.

SISCryptGetPublicKey( ) is called by the client to get the public key prior to encoding the HELLO message.

SISCryptImportKey( ) is called by the client to import the session key on the HELLO ACK and by the server to import the client's public key in the HELLO message.

SISCryptValidatePublicKey( ) is called by the server on receipt of the HELLO message to validate and import the client's public key.

SISCryptGenSessionKey( ) is called by the server prior to sending the HELLO ACK to generate a session key, encrypted by the client's public key.

SISCryptEncryp( ) and SISCryptDecypt( ) work with the CompressBuf structure.

```
//
typedef unsigned long SISCryptProvider;    // HCRYPTPROV
typedef unsigned long SISCryptKey;         // HCRYPTKEY
extern BOOL SS_EXPORT_API SISCryptInitialize(
                            SISCryptProvider*    phProv);              // out
extern BOOL SS_EXPORT_API SISCryptGetPublicKey(
                            SISCryptProvider     hprov,                // in
                            SISCryptKey*         phPublicKey,          // out
                            unsigned char**      ppszPublicKeyBlob,    // out
                            DWORD*               pdwPublicKeyLength);  // out
extern BOOL SS_EXPORT_API SISCryptImportKey(
                            SISCryptProvider     hProv,                // in
                            SISCryptKey*         phKey,                // out
                            unsigned char*       pszKeyBlob,           // in
                            DWORD                dwKeyLength);         // in
extern BOOL SS_EXPORT_API SISCryptValidatePublicKey(
                            SISCryptProvider     hProv,                // in
                            SISCryptKey*         phPublicKey,          // out
                            unsigned char*       pszPublicKeyBlob,     // in
                            DWORD                dwPublicKeyLength);   // in
extern BOOL SS_EXPORT_API SISCryptGenSessionKey(
                            SISCryptProvider     hprov,                // in
                            SISCryptKey          hPublicKey,           // in
                            SISCryptKey*         phSessionKey,         // out
                            unsigned char**      ppszSessionKeyBlob,   // out
                            DWORD*               pdwSessionKeyLength); // out
extern void SS_EXPORT_API SISCryptDestroyKey(
                            SISCryptKey&         hKey);                //
in/out
extern void SS_EXPORT_API SISCryptRelease(
                            SISCryptprovider     hProv );              // in
```

When a message comes in on a socket (bytes are ready to read), the function SISReadMessage is called. This function will block until the entire message has been read or until the connection is closed. The sub-class of CSSSISMessage appropriate to the received message is returned. The session key to be used to decrypt the message is passed in. If a message is in the clear, this is 0 (HELLO, HELLO ACK). If more bytes are read on the socket than are needed to complete the message, they will be saved in a buffer private to SISReadMessage. Because of this, this function is not thread safe and cannot be used by the SISMGR itself.

SISDecodeMessage takes the buffer given (which is already assumed to be a complete message) and decodes it as an actual message. This is the form used by the SISMGR.

SISReadMessage reads the necessary data, then calls SIS-DecodeMessage to build the message structure. The buffer is kept by the message which is constructed and will be freed when the message is deleted. The caller must not modify or free the passed data because it is used as the actual message buffer. The session key to be used for decryption is passed in.

SISCheckMessages returns the number of messages which can be gotten using SISReadMessage without blocking. SISCheckMessages may actually read data, but will not block. If the connection is broken, SISCheckMessages returns -1.

When a message is to be sent, the appropriate concrete sub-class of CSSSISMessage is created and the data is encoded, using the virtual Encode method. Then the message is written onto the socket in one piece. As soon as this function returns, the message can be deleted. The session key to be used for message encryption is passed in. If this is 0, the message is sent in the clear. This happens only in HELLO and HELLO ACK msgs and also the server's NoAccept( ) response.

```
//
extern BOOL SS_EXPORT_API SISReadMessage    (int                nSocketId,
                                             CSSSISMessage*&    pReturn,
                                             SISCryptKey        hSessionKey);
extern BOOL SS_EXPORT_API SISDecodeMessage   (unsigned char*     pBuf,
                                              int                nLen,
                                              CSSSISMessage*&    pReturn,
                                              SISCryptKey        hSessionKey);
extern int  SS_EXPORT_API SISCheckMessages   (int nSocketId);
//
//
extern BOOL SS_EXPORT_API SISSendMessage    (int                nSocketId,
                                             CSSSISMessage*     pMsg,
                                             SISCryptKey        hSessionKey);
```

Each request has a unique code (SIS_REQ_*) which identifies the request (operation) from the client. Success and failure (ACK and NAK) reply messages will be returned for each request message. A simple success message might contain no special information, but a more complex one would contain results of the operation. The format of all NAK messages is the same. When a request is constructed, the next "request sequence number" is assigned to it for sequence verification. This is done automatically when the request is created. The request ID is used to connect the ACK or NAK reply to its original request. This mechanism provides for allowing asynchronous requests.

```
//
typedef unsigned long    SISSessionId;
typedef unsigned long    SISSequence;
enum SISRequestCode
{
    SIS_REQ_HELLO       = 101,   // establish connection with server
    SIS_REQ_LOGON       = 102,   // attempt to log the user in to the corporate DB
    SIS_REQ_LOGOFF      = 103,   // close DB connection for current user
    SIS_REQ_ALLOCSTMT   = 201,   // allocate a statement for executing DML or query
    SIS_REQ_EXEC        = 202,   // execute a DML statement--no query results
    SIS_REQ_QUERY       = 203,   // execute a query and return first rows
    SIS_REQ_FETCH       = 204,   // fetch more results on the statement
    SIS_REQ_FREESTMT    = 205,   // free a statement opened by SIS_REQ_ALLOCSTMT
    SIS_REQ_COMMIT      = 206,   // commit operations on a session
    SIS_REQ_ROLLBACK    = 207,   // rollback operations on a session
    SIS_REQ_FILEINFO    = 208,   // return information about a file on server
    SIS_REQ_FILEOPEN    = 209,   // open a file on the file server
    SIS_REQ_FILEREAD    = 210,   // read a chunk of data from the given file
    SIS_REQ_FILEWRITE   = 211,   // write a chunk of data to the given file
    SIS_REQ_FILECLOSE   = 212,   // close a file opened with OPENFILE
};
class SS_EXPORT_CLASS CSSSISRequestMsg : public CSSSISMessage // ABSTRACT
{
```

-continued

```
public:
    SISRequestCode      GetRequest () const { return m_request; }
    SISSessionId        GetSessionId () const { return m_sessionId; }
    SISSequence         GetSequence () const { return m_sequence; }
    virtual BOOL        Encode  (SISRequestCode,
                                 SISSessionId,
                                 SISSequence&);
    virtual BOOL        Decode ();
                        CSSSISRequestMsg ();
    virtual             ~CSSSISRequestMsg ();
private:
    SISRequestCode      m_request;
    SISSessionId        m_sessionId;
    SISSequence         m_sequence;
};
//
```

"Positive acknowledgement" messages may contain additional information specific to the message to which they reply to. A generic ACK merely indicates that the request was processed successfully. Most of the actual ACKs add information to the basic ACK structure. Thus, the CSSSISACKMsg class is subclassed in parallel to the CSSISSRequestMsg class. Currently these are one-to-one.

All "negative acknowledgement" messages are the same format for simplicity. A NAK code is returned plus optionally some detail as a text message for the user. The NAK code allows the client to perform recovery as appropriate and the detail message may be displayed to the user if desired (probably most interesting for debugging). A single NAK message has an array of error indications within it. This represents the hierarchy of errors which are recognized by the software from general to specific. Often, there will only be a single error, but typically there will be errors from different levels. When constructing a NAK message, the error information passed in is copied into the NAK struct and deleted when the NAK message is deleted. When unpacking a NAK message, the CSSSISErrorInfo structs should be read, but not modified or pointers kept because they will be deleted with the containing message.

```
//
class SS_EXPORT_CLASS CSSSISACKMsg : public CSSSISMessage // ABSTRACT
{
public:
    SISSequence         GetRequestId () const { return m_requestId; }
    SISRequestCode      GetRequestType () const { return m_reqType; }
    virtual BOOL        Encode  (SISSequence      requestId,
                                 SISRequestcode   reqType);
    virtual BOOL        Decode ();
                        CSSSISACKMsg ();
    virtual             ~CSSSISACKMsg ();
private:
    SISSequence         m_requestId;
    SISRequestCode      m_reqType;
};
//
//
enum SISErrorType
{
    SIS_NAK_INTERNAL    = 0,
    SIS_NAK_SISM        = 1,    // SISM errors (one of SIS_ERR_* below)
    SIS_NAK_DBNATIVE    = 2,    // database vendor specific error
    SIS_NAK_DBGENERIC   = 3     // database non-vendor specific error
                                // (one of SIS_DBGEN_ERR_* below)
};
enum SISErrorcode
{
    SIS_ERR_PARAMS      = 100,  // generic error in message params
    SIS_ERR_VERSION     = 101,  // protocol version not supported
    SIS_ERR_KEY         = 102,  // invalid client public key
    SIS_ERR_AUTH        = 103,  // invalid authentication info.
    SIS_ERR_CONNECT     = 104,  // invalid connect string (DB instance)
    SIS_ERR_LIMIT       = 105,  // resource allocation not allowed
    SIS_ERR_REQUEST     = 106,  // unexpected request type
    SIS_ERR_STMTID      = 107,  // invalid statement ID given
    SIS_ERR_ACCESS      = 108,  // access to system resource denied
    SIS_ERR_FILESYS     = 109,  // error opening/reading/writing file
    SIS_ERR_FILEID      = 110,  // invalid file ID given
    SIS_ERR_FILECAT     = 111,  // invalid file category used
    SIS_ERR_CRYPTINIT   = 112,  // error initializing Crypto API
    SIS_ERR_SESSKEY     = 113   // error generating session key
```

-continued

```
};
enum SISDbGenErrorCode
{
    SIS_DBGEN_ERR_WRITECONFLICT   = 101,
    SIS_DBGEN_ERR_DUPCONFLICT     = 102,
    SIS_DBGEN_ERR_INVALLOGON      = 103
};
class SS_EXPORT_CLASS CSSSISErrorInfo
{
public:
    SISErrorType        m_errType;
    unsigned int        m_errCode;
    char*               m_pMessage;
    BOOL                SetErrorInfo  (SISErrorType   type,
                                       unsigned int   code,
                                       const char*    pMessage);
                        CopyErrorInfo (const CSSSISErrorInfo* pCopy);
    void                Release ();
                        CSSSISErrorInfo ();
                        ~CSSSISErrorInfo ();
};
class SS_EXPORT_CLASS CSSSISNAKMsg : public CSSSISMessage // FINAL
{
public:
    SISSequence         GetRequestId () const { return m_requestId; }
    int                 GetErrorCount () const { return m_nErrInfos; }
    CSSSISErrOrInfo*    GetErrorInfo (int nIndex);
    virtual BOOL        Encode     (SISSequence          request,
                                    CSSSISErrorInfo**    ppErrs,
                                    int                  nErr);
    virtual BOOL        Encode     (SISSequence,
                                    SISErrorType         type,
                                    unsigned int         code,
                                    const char*          pMessage);
    virtual BOOL        Decode     ();
    static BOOL         NewNAK   (CSSSISNAKMsg*& pReturn);
                        CSSSISNAKMsg ();
    virtual             ~CSSSISNAKMsg ();
private:
    SISSequence         m_requestId;
    CSSSISErrorInfo**   m_ppErrInfos;
    int                 m_nErrInfos;
};
```

In addition to the RPC protocol initiated by the client, the server can send messages to the client (SIS_NTY_*) These messages are not acknowledged by the client, and the server does not wait for a response. The client can choose to handle or not handle these notifications (for example, notify the user).

The HELLO message contains information from the client which allows the server to begin communicating with it. The major piece of client information is the public key the client is using. The server will encrypt the service reply message with the client's public key. The hello request message is sent clear. The hello reply messages are sent encrypted with the client's public key. All other messages are encrypted with the session key sent by the server in the HELLO ACK message. The HELLO ACK contains a session identifier allocated by the server (which must be sent with every succeeding message), and a session private key randomly generated by the server with which to encrypt all succeeding messages.

```
//
enum SISNotifyCode
{
    SIS_NTY_NOACCEPT    = 101,    // server does not accept
                                  client connection
    SIS_NTY_SHUTDOWN    = 102,    // server is shutting down
    SIS_NTY_TIMEOUT     = 103,    // client has been idle too long
    SIS_NTY_PROTOCOL    = 104,    // invalid use of protocol
    SIS_NTY_SESSION     = 105     // client session state failure
};
class SS_EXPORT_CLASS CSSSISNotifyMsg : public CSSSISMessage // FINAL
{
public:
    SISNotifyCode       GetNotify () const { return m_notify; }
    const char*         GetDetail () const { return m_pDetail; }
    virtual BOOL        Encode   (SISNotifycode,
```

```
                          const char*  pDetail);
    virtual BOOL    Decode  ();
                    CSSSISNotifyMsg ();
    virtual         ~CSSSISNotifyMsg ();
private:
    SISNotifyCode   m__notify;
    char*           m__pDetail;
};
//
//
#define SIS__PROTO__VERSION 0x00010001
class SS__EXPORT__CLASS CSSSISHelloReqMsg : public CSSSISRequestMsg
{
public:
    unsigned long   GetProtoVersion () const { return m__protoVer; }
    unsigned char*  GetKeyData      ()       { return m__pKey; }
    DWORD           GetKeyLength    () const { return m__nKeyLen; }
    virtual BOOL    Encode  (SISSequence& sequence,
                             unsigned char* pKey,
                             int            nKeyLen);
    virtual BOOL    Decode  ();
                    CSSSISHelloReqMsg ();
                    ~CSSSISHelloReqMsg ();
private:
    unsigned long   m__protoVer;
    unsigned char*  m__pKey;
    DWORD           m__nKeyLen;
};
class SS__EXPORT__CLASS CSSSISHelloACKMsg : public CSSSISACKMsg
{
public:
    SISSessionId    GetSessionId    () const { return m__sessionId; }
    unsigned char*  GetKeyData      ()       { return m__pKey; }
    DWORD           GetKeyLength    () const { return m__nKeyLen; }
    virtual BOOL    Encode  (SISSequence   sequence,
                             SISSessionId  sessionId,
                             unsigned char* pKey,
                             int            nKeyLen);
    virtual BOOL    Decode  ();
                    CSSSISHelloACKMsg ();
                    ~CSSSISHelloACKMsg ();
private:
    SISSessionId    m__sessionId;
    unsigned char*  m__pKey;
    DWORD           m__nKeyLen;
};
//
```

The login message takes enough information to allow the user to log into the system. Generally, the login message is the second message sent (after HELLO). This message and all later messages are sent encrypted with the session key sent by the server in the HELLO ACK message.

The logoff message just specifies that the connection to the database is to be closed. This does not shut down the connection, but it does free all resources associated with that login. The commit parameter indicates whether the open transaction on the login should be committed or rolled back. If bCommit is TRUE, then the transaction will be committed. Otherwise, it will be rolled back.

```
//
class SS__EXPORT__CLASS CSSSISLogonReqMsg : public
CSSSISRequestMsg
{
public:
    const char*     GetInstance () const { return m__pInstance; }
    const char*     GetUserName () const { return
                    m__pUserName; }
    const char*     GetPassword () const { return m__pPassword; }
    virtual BOOL    Encode  (SISSessionId  sessionId,
                             SISSequence&  sequence,
                             const char*   pInstance,
                             const char*   pUserName,
                             const char*   pPassword);
    virtual BOOL    Decode  ();
                    CSSSISLogonReqMsg ();
                    ~CSSSISLogonReqMsg ();
private:
    char*           m__pInstance;
    char*           m__pUserName;
    char*           m__pPassword;
};
class SS__EXPORT__CLASS CSSSISLogonACKMsg : public
CSSSISACKMsg
{
public:
    virtual BOOL    Encode  (SISSequence);
    virtual BOOL    Decode  ();
                    CSSSISLogonACKMsg ();
                    ~CSSSISLogonACKMsg ();
};
//
//
class SS__EXPORT__CLASS CSSSISLogoffReqMsg : public
CSSSISRequestMsg
```

```
{
public:
    BOOL            GetCommit () const { return m_bCommit; }
    virtual BOOL    Encode      (SISSessionId    sessionId,
                                 SISSequence&    sequence,
                                 BOOL            bCommit);
    virtual BOOL    Decode      ();
                    CSSSISLogoffReqMsg ();
                    ~CSSSISLogoffReqMsg ();
private:
    BOOL            m_bCommit;
};
class SS_EXPORT_CLASS CSSSISLogoffACKMsg : public
CSSSISACKMsg
{
public:
    virtual BOOL    Encode      (SISSequence);
    virtual BOOL    Decode      ();
                    CSSSISLogoffACKMsg ();
                    ~CSSSISLogoffACKMsg ();
};
```

The SQL execution messages are intended to bundle communications into as few round-trips as possible. Typically, only one round trip is required for each user action. To accomplish this, several logical actions are performed by each request/reply. The major data structure exchanged over the protocol contains an array of values oriented into columns and rows (internally, the data is column major). Each column has a defined width and is guaranteed to be NUL terminated. All data are represented for transmission as strings. The data are encapsulated into the CSSSISColRowData which is used both to specify input bind variable values (in requests) and to return output bind variables (in ACKs).

To construct an instance of CSSSISColRowData, the structure is created by calling the function new. Then DefineCol is called for each column in the result set The width must be specified at creation because the entire data block is allocated in one piece. Once all columns have been defined, Allocate is called to create the space and set up the pointers into the data block. The messages which take pointers to CSSSISColRowData blocks hang onto the pointers until deleted, but do not delete the passed-in blocks. Therefore, the blocks must be kept valid until the message which uses them is deleted, and the blocks must be separately deleted afterwards.

```
//
struct _SISColInfo;
class SS_EXPORT_CLASS CSSSISColRowData
{
public:
    BOOL            AddCol          (int             nWidth,
                                     const char*     pName = NULL);
    BOOL            Allocate        (int nRowCount);
    int             GetNumCols      () const { return m_nCols; }
    int             GetNumRows      () const { return m_nRows; }
    int             GetColWidth     (int             nColIndex) const;
    const char*     GetColName      (int             nColIndex) const;
    int             GetColIndex     (const char*     pName) const;
    BOOL            GetColData      (int             nColIndex,
                                     char*           pBuf) const;
    char*           GetColDataPtr   (int             nColIndex);
    int             GetColDataSize  (int             nColIndex) const;
    BOOL            GetColIndData   (int             nColIndex,
                                     short*          pIndBuf) const;
    short*          GetColIndDataPtr (int            nColIndex);
    char*           GetColRowData   (int nColIndex,
                                     int nRowIndex);
    short           GetColRowInd    (int nColIndex,
                                     int nRowIndex) const;
    void            Reset (void);
    BOOL            SetColData      (int             nColIndex,
                                     const char*     pBuf,
                                     int             numRows);
    BOOL            SetColIndData   (int             nColIndex,
                                     const short*    pIndBuf,
                                     int             numRows);
    BOOL            SetColRowData   (int             nCol,
                                     int             nRow,
                                     const char*     pData);
    BOOL            SetColRowInd    (int             nCol,
                                     int             nRow,
                                     short           indicator);
    BOOL            IsSameShape     (const CSSSISColRowData* pAs) const;
    BOOL            HasSameData     (const CSSSISColRowData* pAs) const;
    void            Release ();
                    CSSSISColRowData ();
                    ~CSSSISColRowData ();
private:
    _SISColInfo*    m_pCols;
    int             m_nmCols;
```

-continued

```
    int         m_nColsize;
    int         m_nRows;
    char*       m_pDataBuf;
    short*      m_pIndBuf;
};
//
```

Before a statement can be executed (either DML or query), a "statement" must be opened. This may or may not correspond to an actual database cursor, but is used to specify the execution context for the statement (encapsulating whatever database state is necessary). For example, in an ODBC implementation, this corresponds to an HSTMT. The statement allocated this way must be closed with a FREESTMT request, otherwise the resources will be held open. The statement may be re-used for subsequent statements by sending an EXEC or a QUERY message using the same statement. The EXEC request is used for a SQL statement which will not produce output columns (or where the client doesn't care) and requires only a single round trip. The given statement can be immediately reused for another statement as desired. Input bind variables can still be used with EXEC. In fact, a DML statement executed with EXEC can be executed multiple times by specifying multiple rows of data in the CSSSISColRowData block used for the input binds. All executions are done at the same time with a single round trip.

If the Commit flag is specified as TRUE, a commit operation will be done after the statement is executed. This helps reduce traffic by avoiding a separate COMMIT request after a single DML statement. If multiple DML statements are to be executed as a transaction, Commit should be specified only on the last one, or a separate COMMIT request should be made.

```
//
typedef unsigned long SISStmtId;
class SS_EXPORT_CLASS CSSSISAllocStmtReqMsg : public CSSSISRequestMsg
{
public:
    virtual BOOL        Encode  (SISSessionId    sessionId,
                                 SISSequence&    sequence);
    virtual BOOL        Decode  ();
                        CSSSISAllocStmtReqMsg ();
                        ~CSSSISAllocStmtReqMsg ();
};
class SS_EXPORT_CLASS CSSSISAllocStmtACKMsg : public CSSSISACKMsg
{
public:
    SISStmtId           GetStmtId () const { return m_stmtId; }
    virtual BOOL        Encode  (SISSequence    sequence,
                                 SISStmtId      stmt);
    virtual BOOL        Decode  ();
                        CSSSISAllocStmtACKMsg ();
                        ~CSSSISAllocStmtACKMsg ()
private:
    SISStmtId           m_stmtId;
};
//
//
class SS_EXPORT_CLASS CSSSISExecReqMsg : public CSSSISRequestMsg
public:
    SISStmtId           GetStmtId () const { return m_stmtId; }
    const char*         GetStmt () const { return m_pStmt; }
    CSSSISColRowData*   GetInputBinds () { return m_pIBinds; }
    BOOL                GetCommit () const { return m_bCommit; }
    virtual BOOL        Encode  (SISSessionId       sessionId,
                                 SISSequence&       sequence,
                                 SISStmtId          stmt,
                                 const char*        pStmt,
                                 CSSSISColRowData*  pIBinds,
                                 BOOL               bCommit);
    virtual BOOL        Decode  ();
                        CSSSISExecReqMsg ();
                        ~CSSSISExecReqMsg ();
private:
    SISStmtId           m_stmtId;
    char*               m_pStmt;
    CSSSISColRowData*   m_pIBinds;
    BOOL                m_bCommit;
};
```

```
                                    -continued class SS_EXPORT_CLASS CSSSISExecACKMsg : public CSSSISACKMsg
{
public:
    int             GetRowsAffected () const { return m_nRows; }
    virtual BOOL    Encode  (SISSequence    sequence,
                             int            nRowsAffected);
    virtual BOOL    Decode  ();
                    CSSSISExecACKMsg ();
                    ~CSSSISExecACKMsg ();
private:
    int             m_nRows;
};
//
```

The QUERY and FETCH requests are used when data is to be returned to the client (from a SELECT statement). Input binding, statement preparation, execution, and initial result fetching are all done by the query request. More data can be collected with the FETCH request. The QUERY request specifies the SQL statement, the input binding values as a CSSSISColRowData block, and the number of rows desired to be fetched immediately. The input binds may only specify a single row of values since the query will be executed only once per request. The reply will return no more than the number of rows specified. This can be zero, in which case the query is executed, but no rows are fetched until a FETCH request is sent.

The QUERY request also defines the shape of the data to be retrieved. A second CSSSISColRowData block should be specified which has the columns defined, but no actual row values (Allocate never called). This is used by SISM in binding output values for retrieving results from the query. The output values in the QUERY and FETCH ACK messages will have the same shape as the block specified in the QUERY request. If the ACK returns all the rows available, the EOF member will be set to true. Further FETCH requests are unnecessary.

The FETCH request specifies a statement started by the QUERY request on which additional rows will be returned. As with QUERY, the reply will return no more than the number of rows specified as the maximum in the QUERY request. If the ACK returns all the rows available, the EOF member will be set to true. There is no need to make further FETCH requests.

```
//
class SS_EXPORT_CLASS CSSSISQueryReqMsg : public
CSSSISRequestMsg
{
public:
    SISStmtId           GetStmtId () const { return m_stmtId; }
    const char*         GetStmt () const { return m_pStmt; }
    CSSSISColRowData*   GetInputBinds () { return m_pIBinds; }
    CSSSISColRowData*   GetOutputDesc () { return m_pODesc; }
    int                 GetMaxFetch () const { return
                        m_nMaxFetch; }
    virtual BOOL        Encode  (SISSessionId       sessionId,
                                 SISSequence&       sequence,
                                 SISStmtId          stmt,
                                 const char*        pStmt,
                                 CSSSISColRowData*  pIBinds,
                                 CSSSISColRowData*  pODesc,
                                 int                nMax
                                                    Fetch);
    virtual BOOL        Decode  ();
                        CSSSISQueryReqMsg ();
                        ~CSSSISQueryReqMsg ();
```

```
                                    -continued private:
    SISStmtId           m_stmtId;
    char*               m_pStmt;
    CSSSISColRowData*   m_pIBinds;
    CSSSISColRowData*   m_pODesc;
    int                 m_nMaxFetch;
};
class SS_EXPORT_CLASS CSSSISQueryACKMsg : public
CSSSISACKMsg
{
public:
    CSSSISColRowData*   GetFetchVals () { return m_pFetch; }
    int                 GetActualRows () const { return
                        m_nActual; }
    BOOL                GetEOF () const { return m_bEOF; }
    virtual BOOL        Encode  (SISSequence        sequence,
                                 CSSSISColRowData*  pFetch,
                                 int                nActual,
                                 BOOL               bEOF);
    virtual BOOL        Decode  ();
                        CSSSISQueryACKMsg ();
                        ~CSSSISQueryACKMsg ();
private:
    CSSSISColRowData*   m_pFetch;
    int                 m_nActual;
    BOOL                m_bEOF;
};
//
//
class SS_EXPORT_CLASS CSSSISFetchReqMsg : public
CSSSISRequestMsg
{
public:
    SISStmtId           GetStmtId () const { return m_stmtId; }
    virtual BOOL        Encode  (SISSessionId    sessionId,
                                 SISSequence&    sequence,
                                 SISStmtId       stmt);
    virtual BOOL        Decode  ();
                        CSSSISFetchReqMsg ();
                        ~CSSSISFetchReqMsg ();
private:
    SISStmtId           m_stmtId;
};
class SS_EXPORT_CLASS CSSSISFetchACKMsg : public
CSSSISACKMsg
{
public:
    CSSSISColRowData*   GetFetchVals () { return m_pFetch; }
    int                 GetActualRows () const { return
                        m_nActual; }
    BOOL                GetEOF () const { return m_bEOF; }
    virtual BOOL        Encode  (SISSequence        sequence,
                                 CSSSISColRowData*  pFetch,
                                 int                nActual,
                                 BOOL               bEOF);
    virtual BOOL        Decode  ();
                        CSSSISFetchACKMsg ();
                        ~CSSSISFetchACKMsg ();
private:
```

-continued

```
    CSSSISColRowData*   m_pFetch;
    int                 m_nActual;
    BOOL                m_bEOF;
};
//
```

The FREESTMT request closes a statement created with the ALLOCSTMT request. This implicitly invalidates any query which is currently active on this statement. The COMMIT request commits outstanding DML operations on the current session (login). The ROLLBACK request rolls back outstanding DML operations on the current session (login).

```
//
class SS_EXPORT_CLASS CSSSISFreeStmtReqMsg : public
CSSSISRequestMsg
{
public:
    SISStmtId       GetStmtId () const { return m_stmtId; }
    virtual BOOL    Encode (SISSessionId   sessionId,
                            SISSequence&   sequence,
                            SISStmtId      stmt);
    virtual BOOL    Decode ();
                    CSSSISFreeStmtReqMsg ();
                    ~CSSSISFreeStmtReqMsg ();
private:
    BOOL            m_stmtId;
};
class SS_EXPORT_CLASS CSSSISFreeStmtACKMsg : public
CSSSISACKMsg
{
public:
    virtual BOOL    Encode (SISSequence);
    virtual BOOL    Decode ();
                    CSSSISFreeStmtACKMsg ();
                    ~CSSSISFreeStmtACKMsg ();
};
//
//
class SS_EXPORT_CLASS CSSSISCommitReqMsg : public
CSSSISRequestMsg
{
public:
    virtual BOOL    Encode (SISSessionId   sessionId,
                            SISSequence&   sequence);
    virtual BOOL    Decode ();
                    CSSSISCommitReqMsg ();
                    ~CSSSISCommitReqMsg ();
};
class SS_EXPORT_CLASS CSSSISCommitACKMsg : public
CSSSISACKMsg
{
public:
    virtual BOOL    Encode (SISSequence);
    virtual BOOL    Decode ();
                    CSSSISCommitACKMsg ();
                    ~CSSSISCommitACKMsg ();
};
//
//
class SS_EXPORT_CLASS CSSSISRollbackReqMsg : public
CSSSISRequestMsg
{
public:
    virtual BOOL    Encode (SISSessionID   sessionID,
                            SISSequence&   sequence);
    virtual BOOL    Decode ();
                    CSSSISRollbackReqMsg ();
                    ~CSSSISRollbackReqMsg ();
};
class SS_EXPORT_CLASS CSSSISRollbackACKMsg : public
CSSSISACKMsg
{
public:
    virtual BOOL    Encode (SISSequence);
    virtual BOOL    Decode ();
                    CSSSISRollbackACKMsg ();
                    ~CSSSISRollbackACKMsg ();
};
//
```

This next group of messages support remote file access through the SISMGR, which is used to implement literature and correspondence (fulfillment) requests. These messages provide simple file-style access to files located on the machine running SISMGR or remotely accessible from it. The basic file operations are supported: open, read, write and close.

Files are requested by category and name. The category can be used to identify different groups of documents and to allow the files to be partitioned for different sets of users. The server may also enforce different access restrictions on different categories. An open file is identified by a SISFileId which is returned by open and which all other file-related requests must provide. This file ID must be closed when the operations are complete.

```
typedef unsigned long SISFileId;
enum SISFileMode
{
    SIS_MODE_NONE   = 0,
    SIS_MODE_READ   = (1 << 0),
    SIS_MODE_WRITE  = (1 << 1),
    SIS_MODE_RDWR   = SIS_MODE_READ | SIS_MODE_WRITE
};
class SS_EXPORT_CLASS CSSSISFileInfoReqMsg : public CSSSISRequestMsg
{
public:
    const char*     GetCategory    () const { return m_pCategory; }
    const char*     GetFileName    () const { return m_pFileName; }
    virtual BOOL    Encode (SISSessionId   sessionId,
                            SISSequence&   sequence,
                            const char*    pCategory,
                            const char*    pFileName);
    virtual BOOL    Decode ();
                    CSSSISFileInfoReqMsg ();
```

-continued

```
                              ~CSSSISFileInfoReqMsg ();
private:
    char*                   m_pCategory;
    char*                   m_pFileName;
};
#ifndef _TIME_T_DEFINED
    typedef long        time_t;
#endif
typedef unsigned int    size_t;
class SS_EXPORT_CLASS CSSSISFileInfoACKMsg : public CSSSISACKMsg
{
public:
    const char*         GetFileName     () const { return m_pFileName; }
    size_t              GetFileSize     () const { return m_nFileSize; }
    time_t              GetCreateTime   () const { return m_createTime; }
    time_t              GetWriteTime    () const { return m_writeTime; }
    SISFileMode         GetFileModes    () const { return m_modes; }
    virtual BOOL        Encode  (SISSequence   sequence,
                                 const char*   pFileName,
                                 size_t        nFileSize,
                                 time_t        createTime,
                                 time_t        writeTime,
                                 SISFileMode   modes);
    virtual BOOL        Decode  ();
                        CSSSISFileInfoACKMsg ();
                        ~CSSSISFileInfoACKMsg ();
private:
    char*               m_pFileName;
    unsigned long       m_nFileSize;
    time_t              m_createTime;
    time_t              m_writeTime;
    SISFileMode         m_modes;
};
class SS_EXPORT_CLASS CSSSISFileOpenReqMsg : public CSSSISRequestMsg
{
public:
    const char*         GetCategory     () const { return m_pCategory; }
    const char*         GetFileName     () const { return m_pFileName; }
    SISFileMode         GetOpenMode     () const { return m_openMode; }
    virtual BOOL        Encode  (SISSessionId  sessionId,
                                 SISSequence&  sequence,
                                 const char*   pCategory,
                                 const char*   pFileName,
                                 SISFileMode   openMode);
    virtual BOOL        Decode  ();
                        CSSSISFileOpenReqMsg ();
                        ~CSSSISFileOpenReqMsg ();
private:
    char*               m_pCategory;
    char*               m_pFileName;
    SISFileMode         m_openMode;
};
class SS_EXPORT_CLASS CSSSISFileOpenACKMsg : public CSSSISACKMsg
{
public:
    SISFileId           GetFileId () const { return m_fileId; }
    const char*         GetFileName     () const { return m_pFileName; }
    size_t              GetFileSize     () const { return m_nFileSize; }
    time_t              GetCreateTime   () const { return m_createTime; }
    time_t              GetWriteTime    () const { return m_writeTime; }
    virtual BOOL        Encode  (SISSequence   sequence,
                                 SISFileId     file,
                                 const char*   pFileName,
                                 size_t        nFileSize,
                                 time_t        createTime,
                                 time_t        writeTime);
    virtual BOOL        Decode  ();
                        CSSSISFileOpenACKMsg ();
                        ~CSSSISFileOpenACKMsg ();
private:
    SISFileId           m_fileId;
    char*               m_pFileName;
    unsigned long       m_nFileSize;
    time_t              m_createTime;
    time_t              m_writeTime;
};
class SS_EXPORT_CLASS CSSSISFileReadReqMsg : public CSSSISRequestMsg
{
public:
```

-continued

```
        SISFileId           GetFileId         () const { return m_fileId; }
        size_t              GetChunkSize      () const { return m_nChunkSize; }
        int                 GetMaxChunks      () const { return m_nMaxChunks; }
        virtual BOOL        Encode     (SISSessionId    sessionId,
                                        SISSequence&    sequence,
                                        SISFileId       file,
                                        size_t          chunkSize,
                                        int             maxChunks);
        virtual BOOL        Decode   ();
                            CSSSISFileReadReqMsg ();
                            ~CSSSISFileReadReqMsg ();
private:
        SISFileId           m_fileId;
        size_t              m_nChunkSize;
        int                 m_nMaxChunks;
};
class SS_EXPORT_CLASS CSSSISFileReadACKMsg : public CSSSISACKMsg
{
public:
        unsigned char*      GetChunkData      ()         { return m_pData; }
        size_t              GetChunkSize      () const   { return m_nDataLen; }
        BOOL                GetEOF            () const   { return m_bEOF; }
        virtual BOOL        Encode     (SISSequence     sequence,
                                        unsigned char*  pData,
                                        size_t          nDataLen,
                                        BOOL            bEOF);
        virtual BOOL        Decode   ();
                            CSSSISFileReadACKMsg ();
                            ~CSSSISFileReadACKMsg ();
private:
        unsigned char*      m_pData;
        size_t              m_nDataLen;
        BOOL                m_bEOF;
};
class SS_EXPORT_CLASS CSSSISFilewriteReqMsg : public CSSSISRequestMsg
{
public:
        SISFileId           GetFileId         () const   { return m_fileId; }
        unsigned char*      GetChunkData      ()         { return m_pData; }
        size_t              GetChunkSize      () const   { return m_nDataLen; }
        virtual BOOL        Encode     (SISSessionId    sessionId,
                                        SISSequence&    sequence,
                                        SISFileId       file,
                                        unsigned char*  pData,
                                        size_t          nDataLen);
        virtual BOOL        Decode   ();
                            CSSSISFileWriteReqMsg ();
                            ~CSSSISFileWriteReqMsg ();
private:
        SISFileId           m_fileId;
        unsigned char*      m_pData;
        size_t              m_nDataLen;
};
class SS_EXPORT_CLASS CSSSISFileWriteACKMsg : public CSSSISACKMsg
{
public:
        virtual BOOL        Encode     (SISSequence    sequence);
        virtual BOOL        Decode   ();
                            CSSSISFileWriteACKMsg ();
                            ~CSSSISFileWriteACKMsg ();
};
class SS_EXPORT_CLASS CSSSISFileCloseReqMsg : public CSSSISRequestMsg
{
public:
        SISFileId           GetFileId () const { return m_fileId; }
        virtual BOOL        Encode     (SISSessionId    sessionId,
                                        SISSequence&    sequence,
                                        SISFileId       file)
        virtual BOOL        Decode   ();
                            CSSSISFileCloseReqMsg ();
                            ~CSSSISFileCloseReqMsg ();
private:
        SISFileId           m_fileId;
};
class SS_EXPORT_CLASS CSSSISFileCloseACKMsg : public CSSSISACKMsg
{
public:
        virtual BOOL        Encode     (SISSequence    sequence);
        virtual BOOL        Decode   ();
```

-continued

```
         CSSSISFileCloseACKMsg ()
        ~CSSSISFileCloseACKMsg ()
};
//
```

Following are wrapper functions for creating all of the different classes implemented in this library, if SISNAPI is not inplemented as a DLL.

```
//
extern BOOL SS_EXPORT_API SISNewMessage  (SISMessageType   msgType,
                                          SISRequestCode   reqCode,
                                          CSSSISMessage*&  pReturn);
extern BOOL SS_EXPORT_API SISNewMessage  (SISMessageType   msgType,
                                          CSSSISMessage*&  pReturn);
extern BOOL SS_EXPORT_API SISNewColRowData (CSSSISColRowData*& pReturn);
extern BOOL SS_EXPORT_API SlSNewErrorInfo (CSSSISErrorInfo*& pReturn);
#endif //_SISNAPI_H_
```

Configuration

SISMGR creates database connections in response to client requests and actions, and does not create an initial connection to the corporate database. At startup, SISMGR loads its configuration information from the Windows NT registry. Configuration information is stored as values set on the Configuration key. The configuration parameters read at startup are as follows:

Allow Connections From

Allows specification of a set of host names or network addresses from which connections will be accepted. Network addresses are specified in the usual format and allow sub-nets to be specified with wildcarding (for example: 206.79.143.* for all addresses in the 206.79.143 "class C" subnet). Multiple host names and network addresses are separated by commas. If specified as *.*.*.*, no host address validation is performed.

Internet Port Number

Specifies the Internet port number at which the server will listen for client connections. Clients must connect to the correct machine and to this port number to contact SISMGR.

Maximum Connections

Specifies the maximum number of connections allowed at any one time. If specified as 0, no limit is placed on the number of connections.

Maximum Idle Minutes

Specifies the maximum number of minutes a client can be idle (not sending any messages) before the connection is automatically closed by SISMGR. This can be used to free up resources held by a client when a salesperson leaves it running. If specified as 0, clients are never timed out.

Connect String Map

Specifies the mappings between "connect strings" specified by the client when connecting and database vendors and "instance" identifiers for instantiating a connector when the client logs in. The format of this value is a sequence of connect string "maps" separated by commas. Each map is comprised of the connect string as specified by the user, the database vendor this corresponds to, and the database instance to connect to. For example: MPengr=oracle:dev indicates that the user-supplied connect string "MPengr" will be implemented by the Oracle connector using the database instance "dev" (which must be known to the machine on which SISMGR is running).

Oracle Connector DLL

Specifies the name of the DLL which implements the connector to Oracle databases. This will be used for connections which map to Oracle database instances. The value should be the name of the DLL which implements the SISM connector for Oracle. For example: ssx30o72.dll for the Oracle 7.2 connector.

Sybase Connector DLL

Specifies the name of the DLL which implements the connector to Sybase SQL Server databases. This will be used for connections which map to Oracle database instances. The value should be the name of the DLL which implements the SISM connector for Sybase SQL Server. For example: ssx30s11.dll for the Sybase system 11 connector.

Informix Connector DLL

Specifies the name of the DLL which implements the connector to Informix On-line databases. This will be used for connections which map to Informix database instances. The value should be the name of the DLL which implements the SISM connector for Informix On-line. For example: ssx30i72.dll for the Inforrix 7.2 connector.

Microsoft Connector DLL

Specifies the name of the DLL which implements the connector to Microsoft SQL Server databases. This will be used for connections which map to Microsoft database instances. The value should be the name of the DLL which implements the SISM connector for Microsoft SQL Server. For example: ssx30m60.dll for the Microsoft 6.0 connector.

Update Frequency

Specifies the frequency in seconds with which SISMGR updates the statistics in the registry key for monitoring programs and checks the control key for shutdown requests. The default is 5 seconds, which allows for fine-grained monitoring.

Message Resource DLL

Specifies the name of the DLL which is loaded for handling error, warning, and informational messages. Internally, error codes are used and are translated into strings only when errors are reported to the user. For example, ssrsis30.enu for US English.

File Root Directory

Specifies the absolute path name to the directory which contains the files which are available to be served to clients using the file access messages.

Configuration Password
Specifies the password which must be entered by the user when starting up the configuration user interface applet. This value is not read or set by SISMGR itself.

A user interface may be provided for editing the registry values. For example, a Windows NT control panel applet may be used, or some other form to make the UI consistent with other system services.

Once the system preferences have been read, SISMGR is up and begins accepting connections.

CONCLUSION

Various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing therefrom.

---

APPENDIX

```
Writing User Transaction Log File for a Given Laptop Node
This program will be called by a server-side process that processes transaction log entries for all
Laptop Nodes. For each Laptop Node, the calling process is building the UserTrxnLogFileName and
calling Program 1.
Input Parameters
        ·   LaptopNodeId - node_id of the destination laptop
        ·   UserTxnLogFileName - full path of the file where txns will be written
        ·   MaxBatchTxns - number of txns between commits and updates to the
            S_DOCK_STATUS table
        ·   MaxTxns - number of txns to process in this session. Use this parameter to limit
            processing.
MAIN ALGORITHM
-- CHECK PARAMETERS
IF (MAXTXNS < 1 || MAXBATCHTXNS < 1) THEN
    INVALID PARAMETER
END IF
-- GET LAST LOG_EXTRACT NUMBER FOR THE LAPTOP FROM S_DOCK_STATUS
LAST_TXN_COMMIT_NUMBER = UTLDSTATGETLOGNUM(LAPTOPNODEID);
-- INITIALIZE VARIABLES
NUMTXNS = 0; -- TOTAL NUMBER OF TXNS PROCESSED
NUMBATCHTXNS = 0; -- TOTAL NUMBER OF TXNS WRITTEN IN THE CURRENT BATCH
-- READ DOCKING OBJECT AND TABLE DEFINITIONS INTO MEMORY STRUCTURES
STARTDICTAP1 ();
-- OPEN THE USER LOG TXN FILE
OPEN USER LOG TXN FILE
-- SELECT AND PROCESS NEW TXNS IN S_DOCK_TRANSACTION_LOG
-- WHERE TXN_COMMIT_NUMBER>LAST_TXN_COMMIT_NUMBER
FOR EACH NEW TXN LOOP
    -- STOP PROCESSING IF REACH MAXTXNS
    IF NUMTXNS = MAXTXNS THEN
        BREAK;
    END IF;
    -- PREVENT CIRCULAR TXNS. DO NOT SEND THE TXN BACK TO THE ORIGINATING LAPTOP
    IF TXN.ORIGINNODEID = LAPTOPNODEID THEN
        GOTO NEXT TRANSACTION
    END IF;
    -- PROCESS ALL OTHER TYPES OF TRANSACTIONS
    -- THIS IS THE VISIBILITY CALCULATOR!
    -- THIS ROUTINE ALSO PROCESSES IMPLICIT VISIBILITY EVENTS
    -- LATER: DATA MERGE CAN CALL THIS FUNCTION TO CHECK WHETHER A TXN IS
    -- STILL VISIBLE WHEN MERGING TXNS INTO A LAPTOP OR SERVER DATABASE.
    CHECKVISIBILITY (LAPTOPNODEID, LOGRECORDTYPE, TABLENAME, TRANSROWID);
    IF TXN IS VISIBLE THEN
    -- WRITE TRANSACTIONS TO USERTXNLOG FILE DEPENDING ON THE
    -- TYPE OF LOGRECORDTYPE.
        WRITE THE TXN TO THE USER LOG FILE
        ++NUMBATCHTXNS
    END IF;
    -- FINISHED PROCESSING THE TXN
    -- COMMIT (IF NEEDED)
    IF NUMBATCHTXNS = MAXBATCHTXNS THEN
            -- ASSUME THAT SEPARATE PROCESS COMES AROUND AND DELETES
            -- TXNS IN S_DOCK_TRANSACTION_LOG THAT HAVE BEEN PROCESSED
            -- FOR ALL NODES. SO, NO NEED TO DELETE THE TXNS FROM THE LOG.
            UPDATE LAST LOG_EXTRACT NUMBER FOR LAPTOP IN S_DOCK_STATUS
            COMMIT;
            NUMBATCHTXNS = 0
```

-continued

APPENDIX

```
        END IF;
        ++NUMTXNS
END LOOP; /* EACH TRANSACTION IN THE TXN LOG TABLE */
-- COMMIT
UPDATE LAST LOG_EXTRACT NUMBER FOR LAPTOP IN S_DOCK_STATUS
COMMIT;
-- CLOSE LOG FILE (IF NEEDED)
IF USERTXNLOGFILEPI!= NULL THEN
        CLOSE FILE;
END IF;
STOPDICTAPI ();
CHECK VISIBILITY ROUTINES
-- CHECK IF A RECORD IN THE TXN LOG IS VISIBLE TO A LAPTOPNODEID
BOOL CHECKVISIBILITY (LAPTOPNODEID, LOGRECORDTYPE, TABLENAME, TRANSROWID)
{
        -- SQLSTATEMENTS ROUTED BASED ON THE DESTINATION LIST
        IF LOGRECORDTYPE IN ('SQLSTATEMENT') THEN
            IF LAPTOP NODE IN DESTINATION LIST THEN
                RETURN TRUE;
            END IF;
        -- SHADOW AND MULTI RECORD LOGRECORDTYPES ARE ROUTED TO ALL NODES
        -- NO VISIBILITY EVENTS WITH THESE LOGRECORDTYPES.
        ELSIF LOGRECORDTYPE IN ('SHADOWOPERATION', 'MULTIRECORDDELETE',
                                'MULTIRECORDUPDATE') THEN
            RETURNTRUE;
        -- SIMPLE DELETES NEED MORE PROCESSING
        ELSIF LOGRECORDTYPE IN ('SIMPLE DELETE') THEN
            IF (TABLE.VISIBILITY IN ('ENTERPRISE', 'LIMITED')) THEN
                RETURNTRUE;
            END IF;
        -- SIMPLE INSERTS AND SIMPLE UPDATES NEED MORE PROCESSING
        -- CHECKTXNVISIBILITY() ALSO PROCESSES IMPLICIT VISIBILITY EVENTS
        ELSIF LOGRECORDTYPE IN ('SIMPLE INSERT', 'SIMPLE UPDATE') THEN
            IF (TABLE.VISIBILITY = 'ENTERPRISE') THEN
                    RETURN TRUE;
            ELSIF TABLE.VISIBILITY = 'LIMITED' THEN
                IF CHECKTXNVISIBILITY (LAPTOPNODEID, TABLE, ROWID) THEN
                    RETURN TRUE;
                ENDIF;
            END IF;
        END IF;
}
-- CHECK IF A RECORD IN THE TXN LOG IS VISIBLE TO A LAPTOPNODEID
STATIC BOOL CHECKTXNVISIBILITY (LAPTOPNODEID, TABLE, ROWID)
{
    BOOL BVISIBLE = FALSE;
    FIND THE TABLE IN THE DICTIONARY;
    IF TABLE NOT FOUND THEN
        ERROR: TABLE NOT DEFINED
    ENDIF;
    FOR ALL DOCKING OBJECTS THAT THE TABLE BELONGS TO LOOP
        -- GENERATE SQL TO GET PRIMARYID VALUES OF THE DOCKING OBJECT
        GENERATEPRIMARYIDSQL (TABLE, ROWID, DOCKINGOBJECT);
        FOR EACH PRIMARYID VALUE RETRIEVED LOOP
            CHECKOBJECTVISIBILITY (LAPTOPNODEID, PRIMARYTABLE, PRIMARYROWID)
            IF OBJECT IS VISIBLE THEN
                -- BECAUSE CHECKOBJECTVISIBILITY() ALSO PROCESSES IMPLICIT
                -- VISIBILITY EVENTS, WE MUST LOOP THROUGH ALL DOCKING OBJECTS
                -- EVEN IF WE ALREADY KNOW THAT THE TXN IS VISIBLE.
                -- EXCEPTION: IF THE TABLE HAS VIS_EVENT_FLG = 'N'
                -- THEN WE CAN RETURN IMMEDIATELY.
                IF TABLE.VISIBILITYEVENTFLG = 'N' THEN
                        RETURN TRUE;
                ELSE
                        BVISIBLE = TRUE;
                    END IF;
                END IF;
            END LOOP;
        END LOOP;
    RETURN BVISIBLE;
}
-- CHECK IF AN INSTANCE OF A DOCKING OBJECT IS VISIBLE TO THE LAPTOP USER.
-- ALSO PROCESSES IMPLICIT VISIBILITY EVENTS!
BOOL CHECKOBJECTVISIBILITY (LAPTOPNODEID, DOCKINGOBJECTNAME, PRIMARYROWID)
{
    FOR EACH VISIBILITY RULE FOR THE DOCKING OBJECT LOOP
        IF RULETYPE = RULESQL THEN
```

-continued

APPENDIX

```
            RUN THE SELECT SQL STATEMENT USING PRIMARYROWID;
            IF ANY ROWS RETURNED THEN
                -- ROW IS VISIBLE
                -- PROCESS AN IMPLICIT DOWNLOAD OBJECT
                    DOWNLOADOBJECTINSTANCE (LAPTOPNODEID, PRIMARYTABLENAME,
                            PRIMARYROWID);
                RETURNTRUE;
            END IF;
            ELSIF RULETYPE = CHECKDOCKINGOBJECT THEN
                RUN THE PARAMETERSQL USING PRIMARYROWID TO GET NEWPRIMARYROWID
                FOR EACH RECORD RETRIEVED BY PARAMETERSQL LOOP
                    -- RECURSIVE!
                    CHECKOBJECTVISIBILITY (LAPTOPNODEID, CHECKDOCKINGOBJECTNAME,
                            NEWPRIMARYROWID);
                    IF RC = TRUE THEN
                        -- PROCESS AN IMPLICIT DOWNLOAD OBJECT
                        DOWNLOADOBJECTINSTANCE (LAPTOPNODEID, PRIMARYTABLENAME,
                                PRIMARYROWID);
                    RETURN TRUE;
                END IF;
            END LOOP;
        END IF;
    END LOOP;
    -- OBJECT IS NOT VISIBLE.
    -- PROCESS AN IMPLICIT REMOVE OBJECT
    REMOVEOBJECTINSTANCE (LAPTOPNODEID, PRIMARYTABLENAME, PRIMARYROWID);
    RETURN FALSE;
}
GENERATE SQL STATEMENT TO GET PRIMARYID
-- GENERATE THE SELECT SQL STATEMENT TO GET THE PRIMARYID VALUE OF
-- THE DOCKING OBJECT FOR THE GIVEN MEMBERTABLE
--
-- SQL STATEMENT LOOKS LIKE:
--      SELECT TP.<ROW_ID>
--          FROM <TABLE_OWNER>.<TABLE>T1,
--              <TABLE_OWNER>.<PKTABLE>T2,
--                  . . . ONE OR MORE INTERMEDIATE TABLES BETWEEN THE TABLE
--                      AND THE PRIMARYTABLE
--              <TABLE_OWNER>.<PKTABLE>TN
--                  <TABLE_OWNER>.<PRIMARYTABLE>TP
--          WHERE T1.ROW_ID = :ROW_ID/* ROW_ID IN TRANSACTIONLOG*/
--              /* JOIN TO PK TABLE T2 */
--              AND T1.<FKCOLUMN> = T2.<PKCOLUMN>
--              AND <T1 FKCONDITION>
--              /* ANY NUMBER OF JOINS UNTIL REACH THE TABLE THAT JOINS
--                  TO THE PRIMARYTABLE */
--              /* JOINFROM T2 TO TN */
--              AND T2.<FKCOLUMN> = TN.<PKCOLUMN>
--              AND <T2 FKCONDITION>
--              /* JOIN TO THE PRIMARYTABLE */
--              AND TN.<FKCOLUMN> = TP.<PKCOLUMN>
--              AND <TN FKCONDITION>
--
-- NOTE THAT THERE MAY BE ONE OR MORE PATHS FROM THE MEMBER TABLE
-- TO THE PRIMARY TABLE. WE NEED TO GENERATE A SQL SELECT STATEMENT
-- FOR EACH OF THE PATHS AND UNION THE STATEMENTS TOGETHER.
--
-- THIS FUNCTION ASSUMES THAT THERE ARE NO LOOPS IN THE DEFINITION.
--
-- THESE SQL STATEMENT DO NOT CHANGE FOR EACH TABLE IN A DOCKING OBJECT,
-- SO WE CAN CALCULATE THEM ONE AND STORE THEM IN MEMORY.
--
STRUCT
{
    CHAR* SELECTLIST;
    CHAR* FROMCLAUSE;
    CHAR* WHERECLAUSE;
    UINT NUMTABLES; /* ALSO THE NUMBER OF JOINT TO REACH THE PRIMARY TABLE */
} GENSTMT;
GENERATEPRIMARYIDSQL (TABLE, DOCKINGOBJECT)
{
    /* THERE MAY BE MORE THAN ONE SQL STATEMENT, SO WE HAVE A DYNAMIC
        ARRAY OF SQL STATEMENTS. EACH ELEMENT IN THE ARRAY IS A PATH
        FROM THE TABLE TO THE PRIMARY TABLE*/
    DYNARRID GENSTMTARR;
    GENSTMT NEWGENSTMT;
    CHAR* SQLSTMT;
```

APPENDIX

```
    DYNARRCREATE (GENSTMTARR),
    -- CREATE THE FIRST ELEMENT AND INITIALIZE
    NEWGENSTMT = MALLOC();
    NEWGENSTMT.NUMTABLES = 1;
    NEWGENSTMT.SELECTLIST = "SELECT ROW_ID";
    NEWGENSTMT.FROMCLAUSE = "FROM <TABLE> T1";
    NEWGENSTMT.WHERECLAUSE = "WHERE T1.ROW_ID = :ROW_ID";
    DYNARRAPPEND (GENSTMTARR, &NEWGENSTMT);
    /* RECURSIVELY FOLLOW FKS TO THE PRIMARYTABLE */
         BUILD THE SELECT, FROM AND WHERE CLAUSE SIMULTANEOUSLY */
    ADDPKTABLE (TABLE, DOCKINGOBJECT, GENSTMTARR, 0);
    -- UNION ALL THE PATHS TOGETHER
    NUMSTMTS = DYNARRSIZE (GENSTMTARR);
    FOR ALL ELEMENTS IN THE ARRAY LOOP
         TMPSQLSTMT = GENSTMTARR[J].SELECTLISTI || GENSTMTARR[J].FROMCLAUSE ||
         GENSTMTARR[J].WHERECLAUSE;
         SQLSTMT = SQLSTMT || 'UNION' || TMPSQLSTMT;
    ENDLOOP;
    DYNARRDESTROY (GENSTMTARR);
    IF SQLSTMT = NULL THEN
         ERROR: NO PATH FROM TABLE TO PRIMARY TABLE.
    END IF;
}
-- RECURSIVELY FOLLOW ALL FKS TO THE PRIMARY TABLE
ADDPKTABLE (TABLE, DOCKINGOBJECT, GENSTMT, INPUTSTMTNUM)
{
    UINT NUMFKS = 0;
    UINT STMTNUM;
    GENSTMT NEWGENSTMT;
    FOR ALL FKS FOR THE TABLE LOOP
         IF PKTABLE IS A MEMBER TABLE OF TRE DOCKING OBJECT THEN
              -- IF THERE'S MORE THAN ONE FK, THEN THERE IS MORE THAN ONE PATH
              -- OUT OF THE CURRENT TABLE.
              -- COPY THE SQL STMT TO A NEW DYNARRELMT TO CREATE A NEW PATH
           IF NUMFKS> 0 THEN
                -- CREATE A NEW ELEMENT AND COPY FROM GENSTMT[INPUTSTMTNUM]
                NEWGENSTMT = MALLOC();
                NEWGENSTMT.NUMTABLES = GENSTMT[INPUTSTMTNUM].NUMTABLES;
                NEWGENSTMT.SELECTLIST = GENSTMT[INPUTSTMTNUM].SELECTLIST;
                NEWGENSTMT.FROMCLAUSE = GENSTMT[INPUTSTMTNUM].FROMCLAUSE;
                NEWGENSTMT.WHERECLAUSE = GENSTMT[INPUTSTMTNUM].WHERECLAUSE;
                DYNARRAPPEND (GENSTMTARR, &NEWGENSTMT);
                STMTNUM = DYNARRSIZE (GENSTMTARR);
                     -- PUT A CHECK HERE FOR INFINITE LOOPS
                     IF STMTNUM = 20 THEN
                          ERROR: PROBABLY GOT AN INFINITE LOOP?
                     END IF;
                ELSE
                     STMTNUM = INPUTSTMTNUM;
                END IF;
                     -- APPEND THE NEW PKTABLE TO THE FROMCLAUSE AND WHERECLAUSE
                GENSTMT[STMTNUM].FROMCLAUSE =
                          GENSTMT[STMTNUM].FROMCLAUSE || ",\N <TABLE>T<NUMTABLES + 1>";
                GENSTMT[STMTNUM].WHERECLAUSE =
                          GENSTMT[STMTNUM].WHERECLAUSE ||
                          "AND T<NUMTABLES>.FKCOLUMN>= T<NUMTABLES + 1>.<PKCOLUMN>" ||
                          "AND <FKCONDITION FOR TABLE IF ANY>";
              ++GENSTMT.NUMTABLES;
              -- PKTABLE IS THE PRIMARY TABLE THEN DONE.
              IF PKTABLE = PRIMARYTABLE THEN
                   RETURN;
              ELSE
                        ADDPKTABLE (PKTABLE, DOCKINGOBJECT, GENSTMT, STMTNUM);
              END IF;
                   -- ONLY COUNT FKS TO OTHER MEMBER TABLES IN THE SAME DOCKING OBJECT
                   ++NUMFKS;
         END IF;
    ENDLOOP;
    RETURN;
}
PROCESS VISIBILITY EVENTS
-- DOWNLOAD AN OBJECT INSTANCE TO A LAPTOP
-- THIS FUNCTION ALSO DOWNLOADS ALL RELATED DOCKING OBJECT INSTANCES.
BOOL DOWNLOADOBJECTINSTANCE (LAPTOPNODEID, OBJECTNAME, PRIMARYROWID)
{
    -- CHECK IF THE OBJECT INSTANCE IS ALREADY DOWNLOADED TO THE LAPTOP
    FIND THE OBJECT INSTANCE IN THE S_DOBJ_INST TABLE
```

APPENDIX

-continued

```
    IF EXISTS ON LAPTOP THEN
        RETURN TRUE;
    END IF;
    -- REGISTER OBJECT INSTANCE IN S_DOBJ_INST TABLE
    -- WRITE DOWNLOAD OBJECT RECORDS TO THE TXN LOG
    FOR EACH MEMBER TABLE OF THE DOCKING OBJECT LOOP
        GENERATE SQL SELECT STATEMENT TO DOWNLOAD RECORDS
        WRITE EACH RETRIEVED RECORD TO THE USER TXN LOG FILE
    END LOOP;
    -- DOWNLOAD RECORDS FOR PARENT OBJECT INSTANCES
    FOR EACH RELATEDDOCKINGOBJECT LOOP
        RUN PARAMETERSQL TO GET NEWPRIMARYID OF RELATEDDOCKINGOBJECTS
        FOR EACH NEWPRIMARYID RETRIEVED LOOP
            -- CHECK IF THE INSTANCE OF THE OBJECT IS VISIBLE TO THE LAPTOP USER
            CHECKOBJECTVISIBILITY (LAPTOPNODEID, OBJECTNAME, PRIMARYROWID)
            IF VISIBLE THEN
                DOWNLOADOBJECTINSTANCE (LAPTOPNODEID,
                            RELATEDDOCKINGOBJECT, NEWPRIMARYROWID);
            END IF;
        END LOOP;
    END LOOP;
    RETURN TRUE;
}
-- REMOVE AN OBJECT INSTANCE TO A LAPTOP
-- THIS FUNCTION ALSO REMOVES ALL RELATED DOCKING OBJECT INSTANCES.
BOOL REMOVEOBJECTINSTANCE (LAPTOPNODEID, OBJECTNAME, PRIMARYROWID)
{
    -- CHECK IF THE OBJECT INSTANCE IS ALREADY DOWNLOADED TO THE LAPTOP
    FIND THE OBJECT INSTANCE IN THE S_DOBJ_INST TABLE
    IF DOES NOT EXIST ON LAPTOP THEN
        RETURN TRUE;
    END IF;
    -- DELETE THE OBJECT INSTANCE FROM S_DOBJ_INST TABLE
    -- WRITE REMOVE OBJECT RECORDS TO THE TXN LOG
    FOR EACH MEMBER TABLE OF THE DOCKING OBJECT LOOP
        GENERATE SQL SELECT STATEMENT TO GET RECORDS TO DELETE
        WRITE EACH RETRIEVED RECORD TO THE USER TXN LOG FILE
    END LOOP;
    -- REMOVE FOR PARENT OBJECT INSTANCES
    FOR EACH RELATEDDOCKINGOBJECT LOOP
        RUN PARAMETERSQL TO GET NEWPRIMARYID OF RELATEDDOCKINGOBJECTS
        FOR EACH NEWPRIMARYID RETRIEVED LOOP
            -- CHECK IF THE INSTANCE OF THE OBJECT IS VISIBLE TO THE LAPTOP USER
            CHECKOBJECTVISIBILITY (LAPTOPNODEID, OBJECTNAME, PRIMARYROWID)
            IF NOT VISIBLE THEN
                REMOVEOBJECTINSTANCE (LAPTOPNODEID,
                            RELATEDDOCKINGOBJECT, NEWPRIMARYROWID);
            END IF;
        END LOOP;
    END LOOP;
    RETURN TRUE;
}
```

We claim:

1. A method of establishing and maintain a secure communication session between a server having a database and a client having an associated public key, comprising:
   (a) sending a message including the client's public key from the client to the sever;
   (b) establishing client authorization at the server;
   (c) encrypting a server session id using the client's public key;
   (d) sending the encrypted server session id and a session private key from the server to the client; and
   (e) sending a request message from said client to said server, said request message including a monotonically increasing message identifier.

2. The method of claim 1 further comprising the step of:
   (a) sending all messages between the client and the server with the server session id included therein.

3. The method of claim 1 wherein the server session id is a unique id.

4. The method of claim 1 wherein the server session id increases monotonically.

5. The method of claim 1 further comprising the step of:
   (a) storing the client private key at the client.

6. The method of claim 1 further comprising the step of:
   (a) sending SQL queries as individual messages.

7. The method of claim 1 wherein the communication session is a TCP/IP session.

8. The method of claim 1 further comprising the step of providing updates to the client, wherein the client is located in a network of partially replicated relational database systems.

9. The method of claim 1 further comprising the step of accessing the database by the client using the server, wherein the server is a networked proxy server.

10. The method of claim 1 further comprising the step of:
    (a) selectively propagating updates from the database, wherein the database is a central database, to a partially replicated database.

11. The method of claim 1 further comprising the step of:
(a) selectively propagating updates from the database, wherein the database is a partially replicated database, to another partially replicated database.

12. The method of claim 1 further comprising the step of:
(a) determining visibility of the client by use of predetermined rules stored in a rules database.

13. The method of claim 1, wherein the client has a partially replicated database, further comprising the step of:
(a) determining changes in visibility to enable the server to direct the client to insert a docking object into the partially replicated database.

14. The method of claim 1 further comprising the step of using a Docking Object to synchronize the database, wherein the database is a central database, with databases on the client.

15. The method of claim 1 further comprising the step of transmitting a transaction over the Internet from the server to the client.

16. The method of claim 1 further comprising the step of sending the transaction to a networked proxy server.

17. The method of claim 1, wherein the server has an application server process, further comprising the steps of:
(a) continuously running the application server process;
(b) using the application server process to connect the client and the database;
(c) using the application server process to accept connections from the client, wherein the client is a remote client; and
(d) configuring a machine running the application server process as a networked proxy server.

18. The method of claim 1, wherein the server has an application server process, further comprising the step of:
(a) keeping a list of hosts allowed to connect to the server; and
(b) rejecting connections from hosts not on the list.

19. A system for establishing and maintaining a secure communication session between a server having a database and a client having an associated public key, wherein the system is configured to:
(a) send a message including the client's public key from the client to the server;
(b) establish client authorization at the server
(c) encrypt a server session id using the client's public key;
(d) send the encrypted server session id and a session private key from the server to the client; and
(e) send a request message from said client to said server, said request message including a monotonically increasing message identifier.

20. A system for establishing and maintaining a secure TCP/IP session, said system comprising:
(a) a server in communication with a database, said server adapted to receive messages;
(b) a client sending a message to said server, wherein said message includes a public key associated with said client;
(c) an authorization system authorizing the client at the server; and
(d) an encryption system encrypting a server session id using said public key;
(e) wherein said server sends the encrypted server session id and a session private key to said client, and said client sends a request message to said server, said request message including a monotonically increasing identifier.

21. The system of claim 20 is further configured to:
(a) send all messages between the client and the server with the server session id included therein.

22. The system of claim 20 wherein the server session id is a unique id.

23. The system of claim 20 wherein the system is configured to increase the server session id monotonically.

24. The system of claim 20 wherein the system is further configured to:
(a) store the client private key at the client.

25. The system of claim 20 wherein the system is further configured to:
(a) send SQL queries as individual messages.

26. The system of claim 20 wherein the communication session is a TCP/IP session.

27. The system of claim 20 wherein the client is located in a network of partially replicated relational database systems and the system is further configured to provide updates to the client.

28. The system of claim 20 wherein the server is a networked proxy server and the system is configured to access the database by the client using the server.

29. The system of claim 20 wherein the database is a central database and the system is further configured to:
(a) selectively propagate updates from the central database at the server to a partially replicated database at the client.

30. The system of claim 20 wherein the system is further configured to:
(a) selectively propagate updates from a partially replicated database at a client to another partially replicated database at another client.

31. The system of claim 20 wherein the system is further configured to:
(a) determine visibility of the client by use of predetermined rules stored in a rules database.

32. The system of claim 20, wherein the client has a partially replicated database, wherein the system is further configured to:
(a) determine changes in visibility to enable the server to direct the client to insert a docking object into the partially replicated database.

33. The system of claim 20 wherein the system is further configured to: use a Docking Object to synchronize the central database on the server with databases on the client.

34. The system of claim 20 wherein the system is further configured to: transmit a transaction over the Internet from the server to the client.

35. The method of claim 20 wherein the system is further configured to: send the transaction to a networked proxy server.

36. The system of claim 20, wherein the server has an application server process, the client is a remote client, and the server is further configured to:
(a) continuously run the application server process;
(b) use the application server process to connect the client and the database;
(c) use the application server process to accept connections from the client; and
(d) configure a machine running the application server process as a networked proxy server.

37. The system of claim 20, wherein the server has an application server process, wherein the system is further configured to:
(a) keep a list of hosts allowed to connect to the server; and (b) reject connections from hosts not on the list.

38. A method of establishing and maintaining a secure communication session between a server having a database and a client, comprising:

receiving a first message from a database client, said first message including a client public key;

generating a session identifier associated with a communication session;

generating a private key associated with said database client;

encrypting, with said public key, said session identifier and said private key in a second message;

sending said second message to said database client; and receiving a request message from said database client, wherein said request message includes a monotonically increasing message identifier.

39. A method of establishing and maintaining a secure communication session between a server having a database and a client, comprising:

sending a first message to a server, said first message including a client public key;

receiving a second message from said server, said second message encrypted with said client public key;

decrypting said second message with a client private key;

extracting a session identifier and a session private key from said decrypted second message;

generating a request message, wherein said request message includes a monotonically increasing message identifier; and encrypting said request message with said session private key.

40. A computer program product for enabling a processor in a computer system to implement a system for establishing and maintaining a secure communication session between a server having a database and a client, said computer program product comprising:

a computer usable medium having computer readable program code means embodied in said computer usable medium for causing a program to execute on the computer system, said computer readable program code means comprising:

means for enabling the computer system to receive a first message from a database client, said first message including a client public key;

means for enabling the computer system to generate a session identifier associated with a communication session;

means for enabling the computer system to generate a private key associated with said database client;

means for enabling the computer system to encrypt, with said public key, said session identifier and said private key in a second message;

means for enabling the computer system to send said second message to said database client; and means for enabling the computer system to receive a request message from said database client, wherein said request message includes a monotonically increasing message identifier.

41. A computer program product for enabling a processor in a computer system to implement a system for establishing and maintaining a secure communication session between a server having a database and a client, said computer program product comprising:

a computer usable medium having computer readable program code means embodied in said computer usable medium for causing a program to execute on the computer system, said computer readable program code means comprising:

means for enabling the computer system to send a first message to a server, said first message including a client public key;

means for enabling the computer system to receive a second message from said server, said second message encrypted with said client public key;

means for enabling the computer system to decrypt said second message with a client private key;

means for enabling the computer system to extract a session identifier and a session private key from said decrypted second message;

means for enabling the computer system to generate a request message, wherein said request message includes a monotonically increasing message identifier; and means for enabling the computer system to encrypt said request message with said session private key.

42. A method of establishing and maintaining a secure communication session between a server having a database and a client having an associated public key, comprising:

(a) sending a message including the client's public key from the client to the server;

(b) establishing client authorization at the server;

(c) encrypting a server session id using the client's public key;

(d) sending the encrypted server session id and a session private key from the server to the client; and (e) sending a request message from said client to said server, said request message including an identifier to prevent said request message from being replayed.

43. A method of establishing and maintaining a secure communication session between a server having a database and a client, comprising:

receiving a first message from a database client, said first message including a client public key;

establishing authorization for said database client;

generating a session identifier associated with a communication session;

generating a private key associated with said database client;

encrypting, with said public key, said session identifier and said private key in a second message;

sending said second message to said database client; and receiving a request message from said database client, said request message including an identifier to prevent said request message from being replayed.

* * * * *